(12) United States Patent
Otsuka et al.

(10) Patent No.: US 9,199,670 B2
(45) Date of Patent: Dec. 1, 2015

(54) VEHICLE BODY

(71) Applicant: NIPPON STEEL & SUMITOMO METAL CORPORATION, Chiyoda-ku, Tokyo (JP)

(72) Inventors: Kenichiro Otsuka, Tokyo (JP); Ryuichi Nishimura, Tokyo (JP); Yoshiaki Nakazawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/390,066

(22) PCT Filed: Apr. 9, 2013

(86) PCT No.: PCT/JP2013/060756
§ 371 (c)(1),
(2) Date: Oct. 2, 2014

(87) PCT Pub. No.: WO2013/154114
PCT Pub. Date: Oct. 17, 2013

(65) Prior Publication Data
US 2015/0061323 A1     Mar. 5, 2015

(30) Foreign Application Priority Data
Apr. 10, 2012 (JP) ................................ 2012-088943

(51) Int. Cl.
*B62D 25/20* (2006.01)
*B62D 21/15* (2006.01)
*B62D 27/02* (2006.01)

(52) U.S. Cl.
CPC .......... *B62D 25/2036* (2013.01); *B62D 21/157* (2013.01); *B62D 27/023* (2013.01)

(58) Field of Classification Search
CPC ........ B62D 21/03; B62D 21/09; B62D 25/20; B62D 25/2009; B62D 25/2036

USPC ............. 296/187.07, 193.09, 205, 29, 187.08
See application file for complete search history.

(56) References Cited

U.S. PATENT DOCUMENTS 5,882,065 A * 3/1999 Koiwa et al. .............. 296/203.02
5,992,921 A * 11/1999 Seki .......................... 296/187.09
(Continued)

FOREIGN PATENT DOCUMENTS

| EP | 2 541 093 | 1/2013 |
|----|-----------|--------|
| JP | 02-141372 | 5/1990 |

(Continued)

OTHER PUBLICATIONS

International Preliminary Report on Patentability dated Oct. 16, 2014 issued in corresponding PCT Application No. PCT/JP2013/060756.
(Continued)

*Primary Examiner* — H Gutman
(74) *Attorney, Agent, or Firm* — Kenyon & Kenyon LLP

(57) ABSTRACT

In a floor cross member configured by a web surface (4a) as the top surface, a ridge part (4b) contiguous to the web surface (4a), and a vertical wall surface (4c) contiguous to the ridge part (4b), having a tensile strength of 440 MPa or larger, flanges (4e) are formed at both longitudinal ends continuously around at least the web surface (4a), the ridge part (4b) and the vertical wall surface (4c), and the floor cross member (4) is connected through the flanges (4e) to a tunnel part (2a) and to a side sill (3). The flange (4e) has a flange width $l_{fc}$, at the center in the perimeter direction of the curved part (4e-2), not smaller than the minimum flange width $l_{fs}$ of the curved part (4e-2). Accordingly, a vehicle body, which is suppressed in deformation of the floor cross member (4) and improved in the torsional rigidity, is successfully provided.

19 Claims, 24 Drawing Sheets

(56) References Cited

U.S. PATENT DOCUMENTS

| | | | |
|---|---|---|---|
| 7,500,714 B2 * | 3/2009 | Abe et al. | 296/193.07 |
| 2007/0215402 A1 * | 9/2007 | Sasaki et al. | 180/232 |
| 2012/0119542 A1 * | 5/2012 | Mildner et al. | 296/187.09 |

FOREIGN PATENT DOCUMENTS

| | | |
|---|---|---|
| JP | 2996031 | 12/1999 |
| JP | 3120635 | 12/2000 |
| JP | 3125476 | 1/2001 |
| JP | 2003-112662 | 4/2003 |
| JP | 2006-159934 | 6/2006 |
| JP | 2007-230423 | 9/2007 |
| JP | 2009-107424 | 5/2009 |
| JP | 2010-105428 | 5/2010 |
| WO | WO 2012/026580 | 3/2012 |

OTHER PUBLICATIONS

International Search Report dated Jun. 25, 2013 issued in corresponding PCT Application No. PCT/JP2013/060756 [with English Translation].

* cited by examiner

F I G. 1A
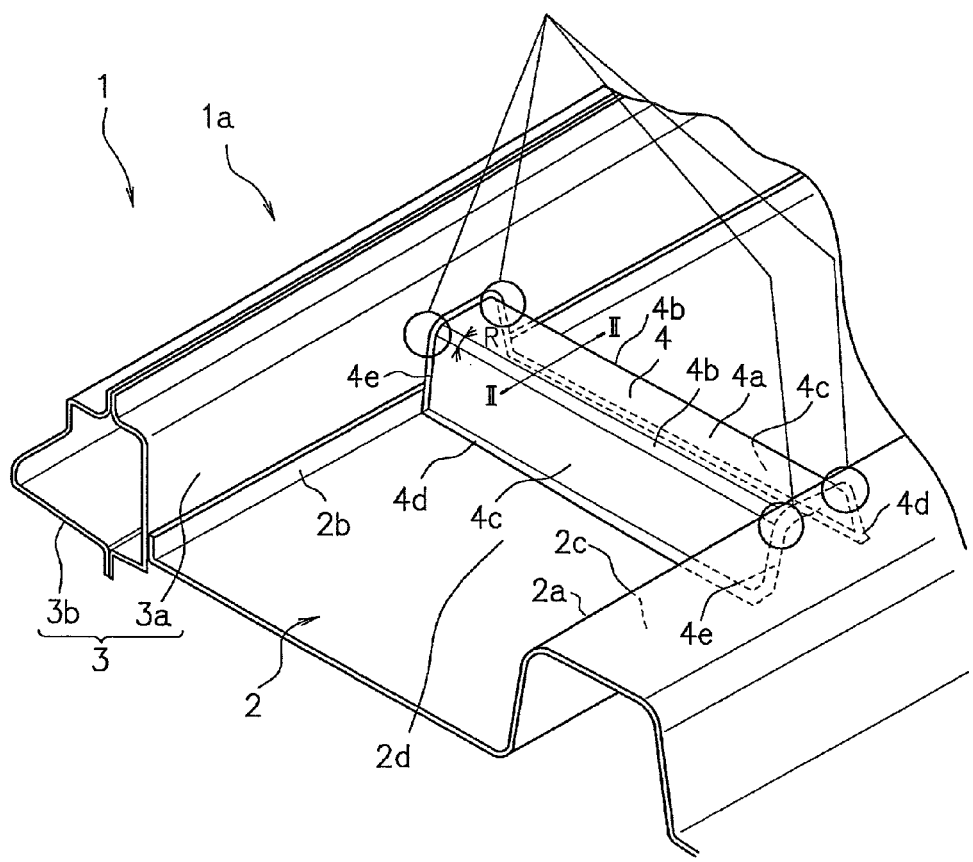
F I G. 1B
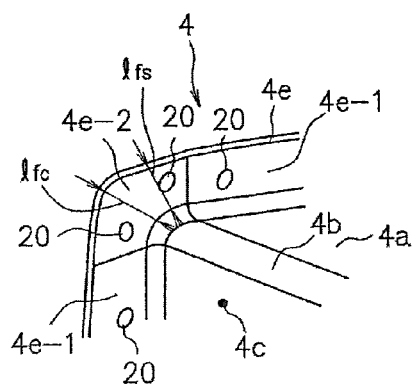
F I G. 1C
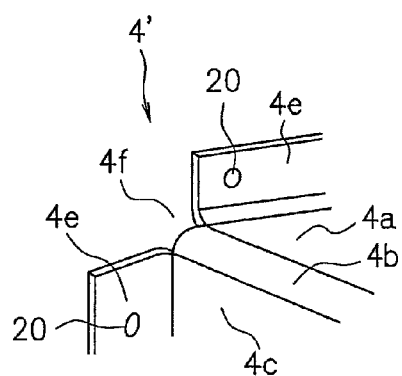
PRIOR ART

F I G. 2A
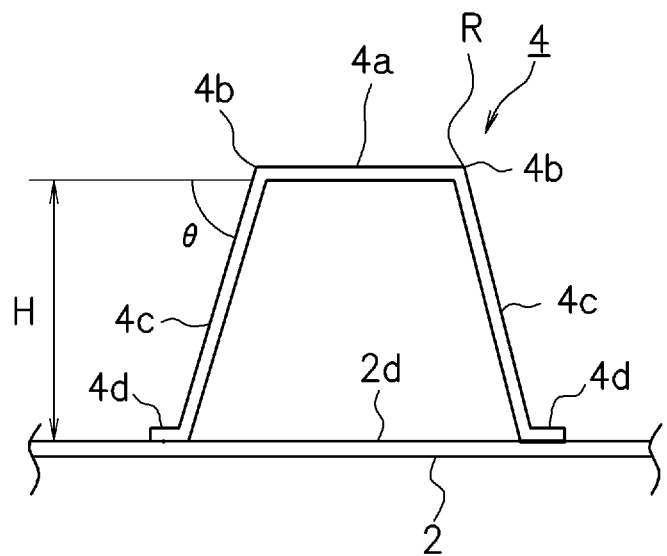
F I G. 2B
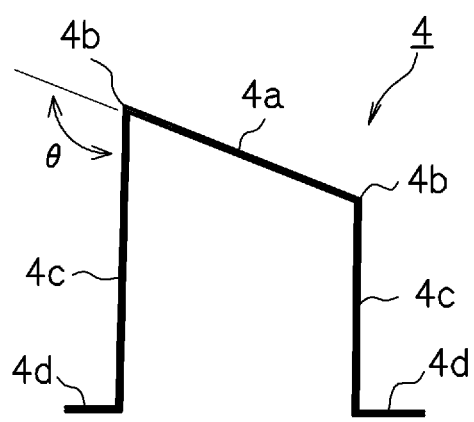

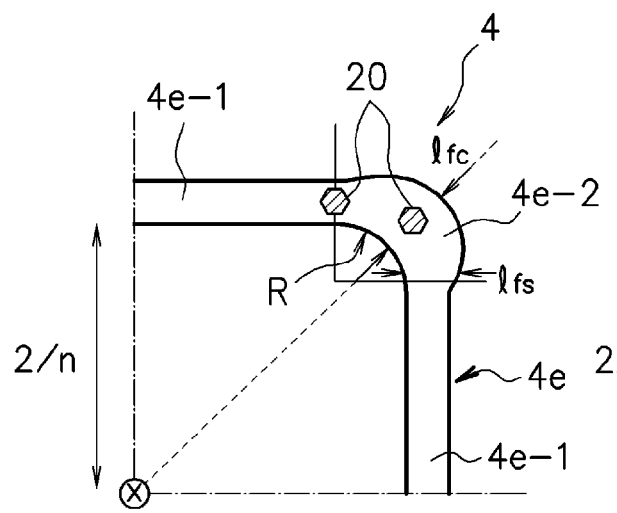
F I G. 3C
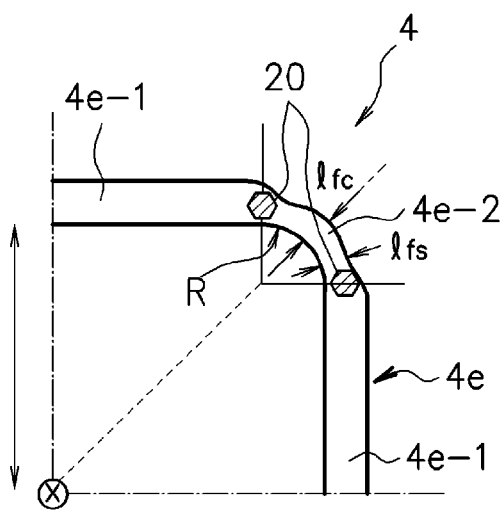
F I G. 3D

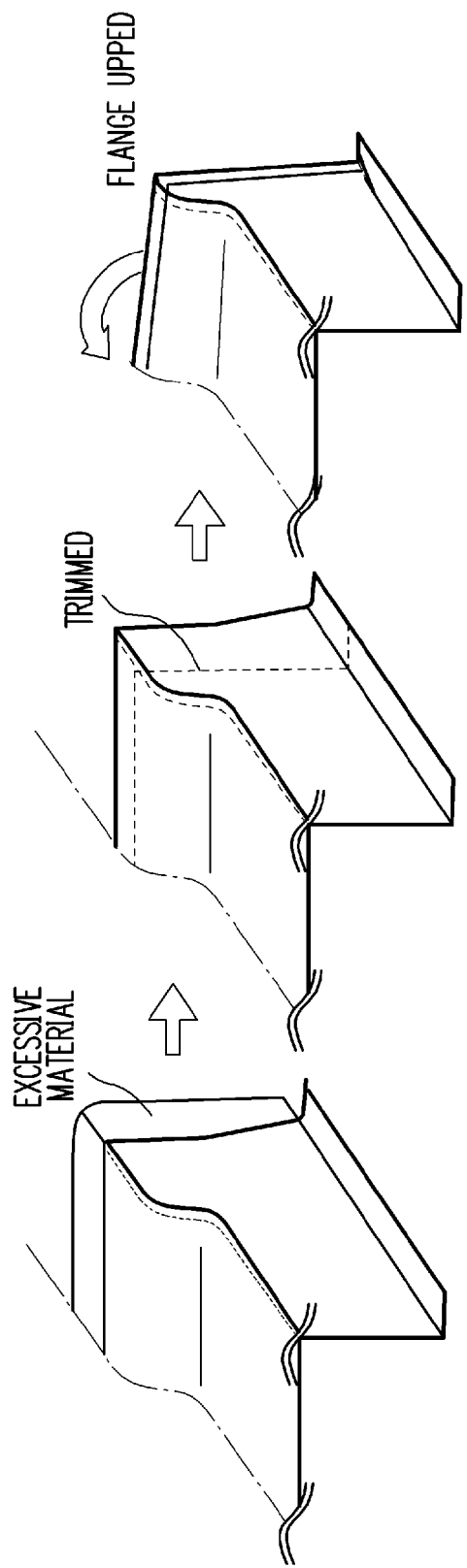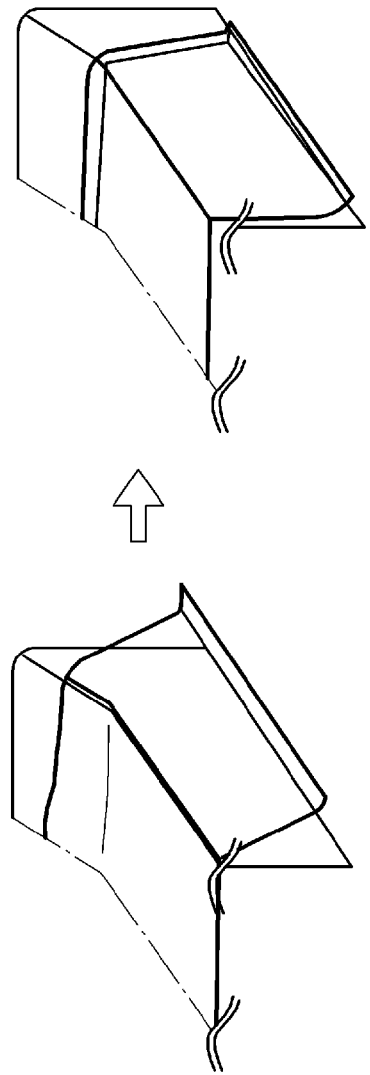

RIDGE PART-CORRESPONDING AREA

RIDGE PART-CORRESPONDING AREA

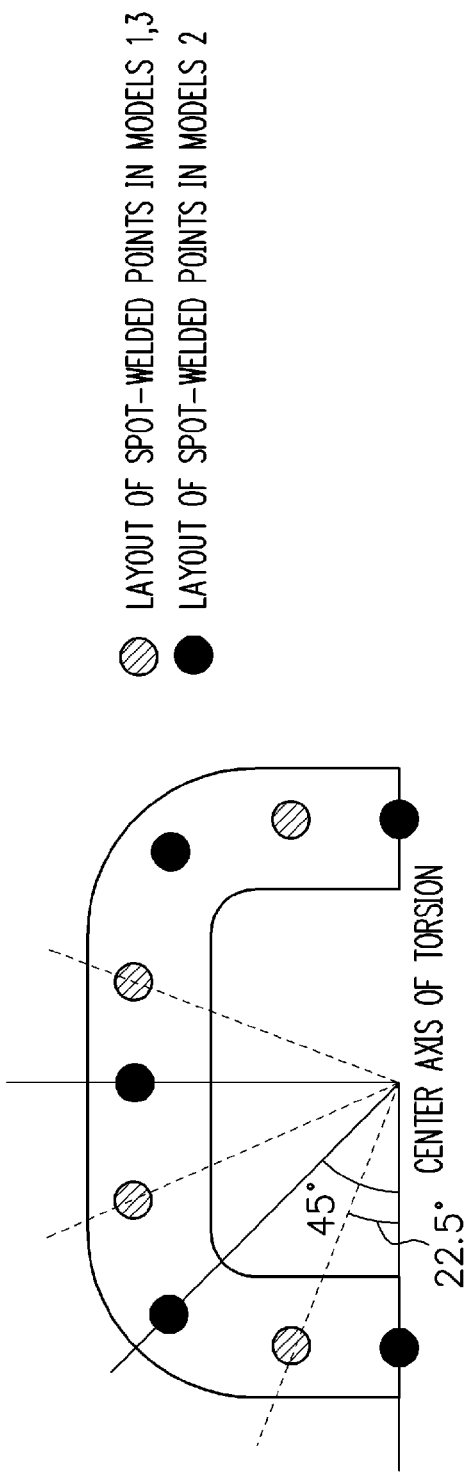

F I G. 18
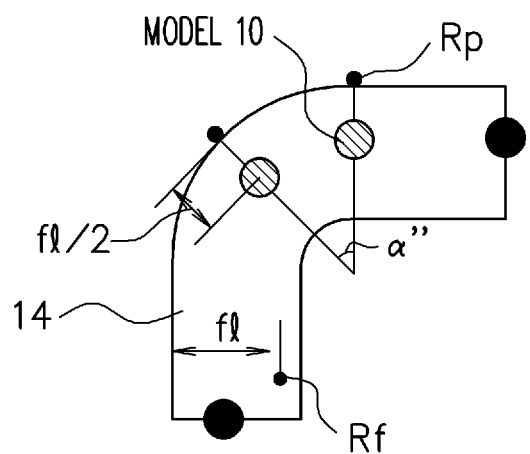
F I G. 19
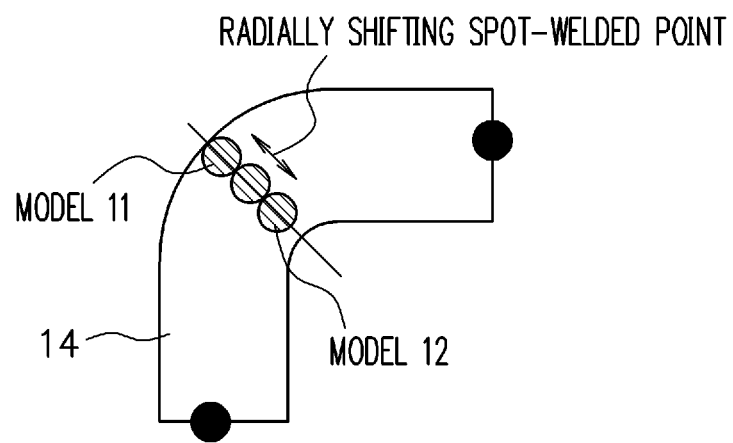

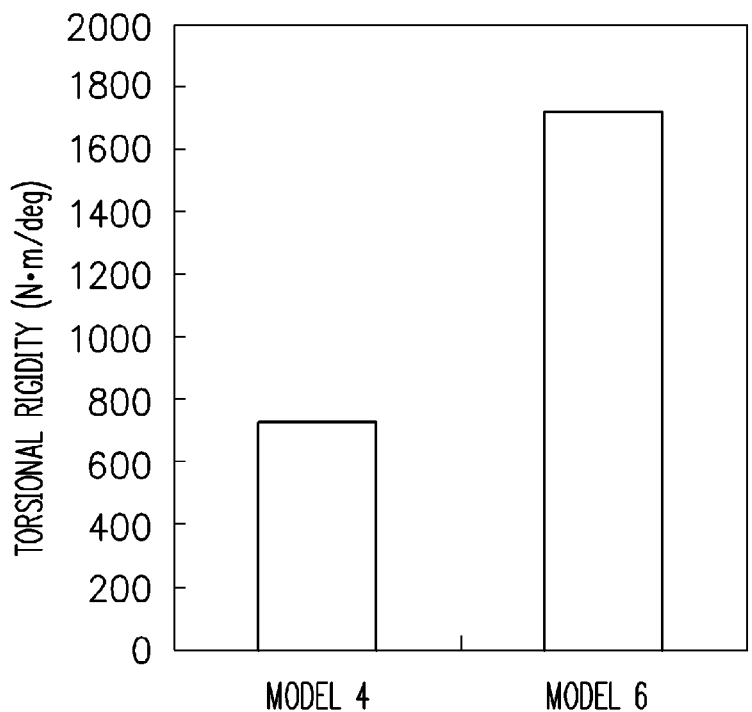
F I G. 22
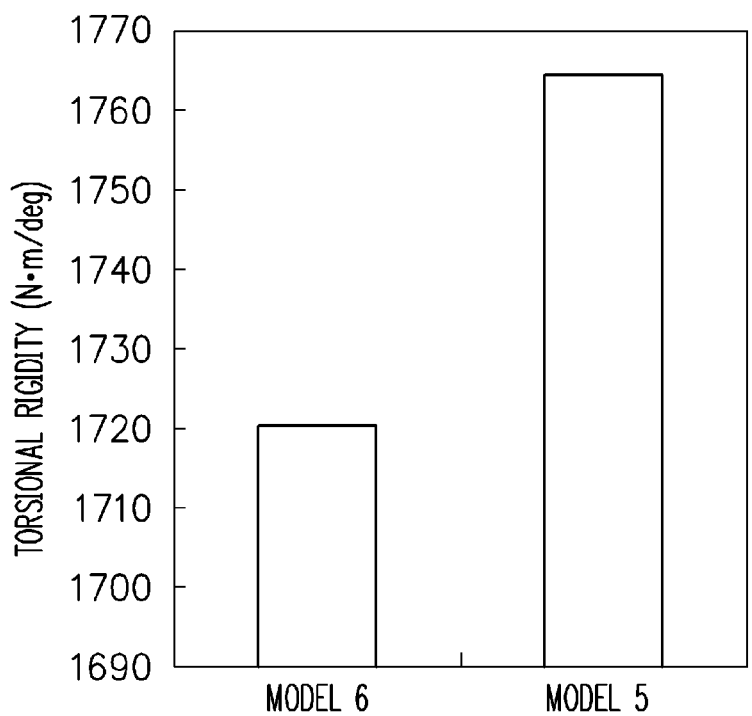
F I G. 23

F I G. 29
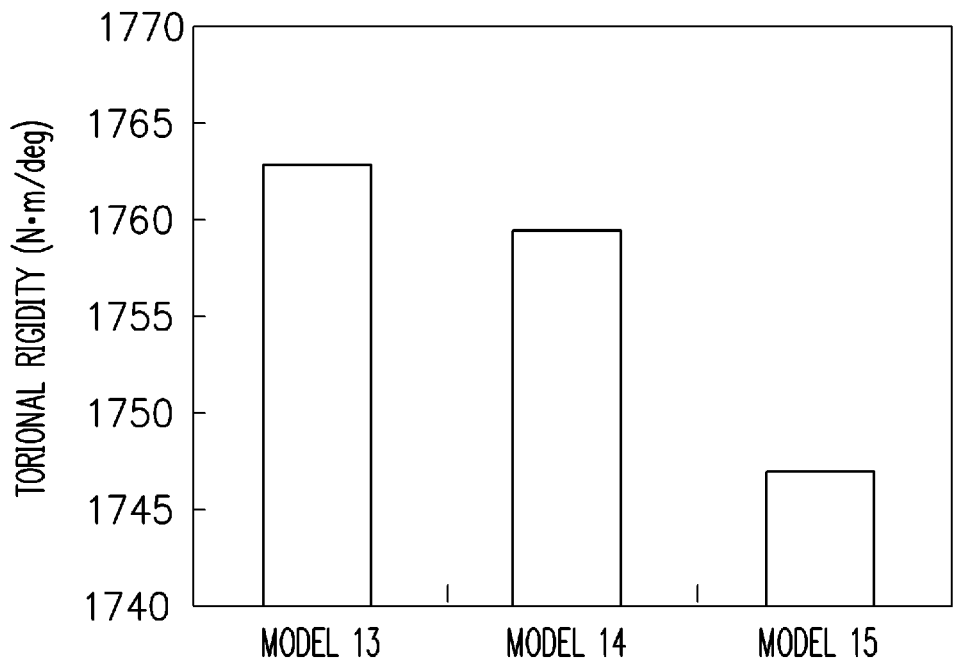
F I G. 30
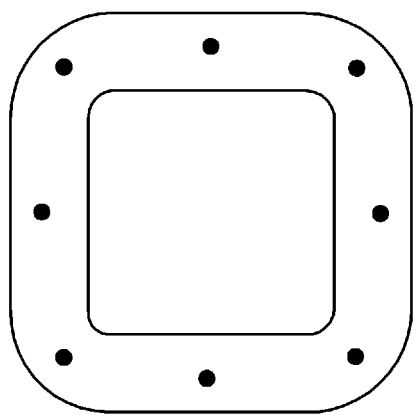
MODEL 16
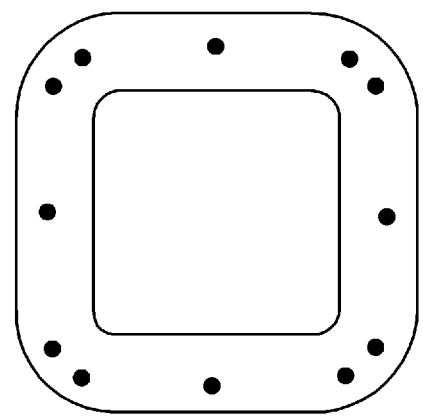
MODEL 17

VEHICLE BODY

This application is a national stage application of International Application No. PCT/JP2013/060756, filed Apr. 9, 2013, which claims priority to Japanese Application No. 2012-088943, filed Apr. 10, 2012, which is incorporated by reference in its entirety.

TECHNICAL FIELD

The present invention relates to a vehicle body which has a longitudinal member disposed as aligned in the front-back direction of the vehicle body, and a widthwise member disposed as aligned in the widthwise direction of the vehicle body.

BACKGROUND ART

Vehicle body composed of a unit construction body (monocoque body) is configured by using, as main skeletal components, long longitudinal members such as side sill, roof rail, front floor having floor tunnel part, and side member, which are disposed as aligned in the front-back direction of the vehicle body; and long widthwise members such as floor cross member and roof cross member, which are disposed as aligned in the widthwise direction of the vehicle body. The longitudinal member and the widthwise member are generally joined with each other through flanges formed at the longitudinal (axial) ends of the widthwise member, in order to ensure rigidity of the vehicle body and to bear the load.

The widthwise member is applied with load in the axial direction thereof induced by deformation of the cross-sectional shape of the longitudinal member, and also with torsional moment induced by displacement of the longitudinal member. The widthwise member is, therefore, required to suppress deformation possibly caused by the load applied in the axial direction, and to have a high torsional rigidity which affects driving stability of vehicles.

To minimize the amount of deformation of the widthwise member, it is necessary to effectively apply the axial load to the cross section of the widthwise member, and to optimize the cross-sectional shape and joining conditions of the widthwise member.

Also for the purpose of elevating the torsional rigidity of the widthwise member, it is again necessary to optimize the cross-sectional shape and joining conditions of the widthwise member, similarly as described above.

For the purpose of suppressing deformation of the widthwise member under axial load, it is preferable to ensure a large cross-sectional area of the widthwise member, and to join the widthwise members with the longitudinal member at points in the flange as close as possible to the cross-sectional profile. On the other hand, for the purpose of enhancing the torsional rigidity of the widthwise member, it is again preferable to ensure a large cross-sectional area of the widthwise member. However, in contrast to the above-described conditions for suppressing deformation, it is preferable to join the widthwise member with the longitudinal member, at points in the flange as apart as possible from the cross-sectional profile. In short, while ensuring a large cross-sectional area of the widthwise member, the geometry of flange of the widthwise member and the points of joining are necessarily optimized, taking suppression of deformation and improvement in the torsional rigidity of the widthwise member into consideration.

Now the flange, which is formed at the longitudinal end of the widthwise member and serves as a joint part between the widthwise member and the longitudinal member, is molded by press molding as a result of extensional deformation. Accordingly, all efforts of forming the flange along the ridge part of the widthwise member will inevitably result in concentration of the extensional deformation locally at the edge of the flange. As a consequence, in the process of press forming, the flange would sometimes rupture at the edge thereof, when intended to be long enough in width.

It has therefore been a conventional practice to provide a notch at around the ridge part of the widthwise member, rather than providing the flange. Alternatively, even if the flange is formed along the ridge part of the widthwise member, the flange has been minimized in width in a portion thereof corresponded to the center in the perimeter direction of the ridge part. As a consequence, the widthwise member has no joining point, typically by spot welding, in the flange thereof especially in a portion corresponded to the ridge part. This has been one of the causes of inhibiting suppression of deformation and improvement in torsional rigidity of the widthwise member.

A specific explanation will be given below, referring to the case where the longitudinal member is configured by the side sills and the tunnel part of a front floor panel, and the widthwise member is configured by the floor cross member. The floor of the vehicle body (simply referred to as "floor", hereinafter) not only primarily takes part in ensuring necessary levels of torsional rigidity and flexural rigidity of the vehicle body during driving, but also takes part in transmission of impact load in case of car crash, and largely affects the weight of vehicle body. The floor is therefore required to satisfy contradictory requirements regarding high rigidity and light weight. A general structure employed by the floor is such as having the front floor panel; and a floor cross member which is joined to the top surface (the surface faced to the cabin) of the front floor panel, and connects the tunnel part which is formed so as to bulge at around the widthwise center of the front floor panel, and side sill inner panels which are spot-welded to both widthwise edges of the front floor panel. By spot-welding the floor cross member to the front floor panel, the tunnel part, and to the side sill inner panels, the floor structure will be improved in rigidity, and in load transmission performance under impact load.

In the conventional process of spot welding of the floor cross member respectively to the top surface of the front floor panel, the outer surfaces of the side sill inner panels, and to the vertical wall surface of the tunnel, part of the front floor panel, it was general to use an outward flange formed, as a welding margin, at both longitudinal ends of the floor cross member.

The floor cross member is a structural component which takes part in improving the rigidity of vehicle body and in absorbing impact load in case of side impact. In recent years, from the viewpoints of weight, reduction and improvement in collision safety, a thinner and more strong high tensile strength steel, for example a high tensile strength steel (HTSS) having a tensile strength of 390 MPa or larger, is used as a material for the floor cross member.

The high tensile strength steel has, however, suffered from a low design freedom of the floor cross member, due to its poor formability.

More specifically, for the case where the floor cross member is composed of a high tensile strength steel of 390 MPa or higher, the flange, which is formed at the end of the floor cross member to be serve as the joint part with the side sill inner panels or with the tunnel part, will be affected by a severe stretch flanging at the edge of the curved part, and may rupture in the process of press forming due to poor formability of the floor cross member. The floor cross member has, therefore, had to be compensated for the shortage of the formability typically by provision of a notch, rather than provision of the flange, at around the ridge part, while resigning itself to degradation in the torsional rigidity and load transmission performance. The notch has, however, been concerned about degradation of various performances of the floor cross member, including collision characteristic regarding axial collapse, and torsional rigidity.

Regarding this sort of technology, Patent Literature 1 discloses a floor structure directed to suppress deformation of vehicle interior in case of collision, by providing a means for reducing impact deformation strength, such as a notch, at the end of the floor cross member.

Patent Literature 2 discloses a floor structure in which the floor cross member is connected to a side sill, by connecting the floor cross member to a side sill reinforcement.

Patent Literature 3 discloses a floor structure elevated in the rigidity by welding the floor cross member and the side sill, by spot-welding the upper part of a side sill inner panel and the flange of the floor cross member.

Patent Literature 4 discloses a floor structure in which the floor cross member and the side sill are connected, by folding the edge of the side sill inner panel to be connected to the floor cross member.

CITATION LIST

Patent Literature

[Patent Literature 1] Specification of Japanese Patent No. 3120635
[Patent Literature 2] Specification of Japanese Patent No. 2996031
[Patent Literature 3] Specification of Japanese Patent No. 3125476
[Patent Literature 4] Japanese Laid-open Patent Publication No. 02-141372

SUMMARY OF INVENTION

Technical Problem

The floor structure disclosed in Patent Literature 1 has a risk of excessive intrusion, into the cabin, of a deformed part caused by the means for reducing impact deformation, if the impact load is large.

The floor structure disclosed in Patent Literature 2 has a fear of complicating the geometry of the side sill inner panel and the floor cross member, and of inducing crack or degradation of dimensional accuracy in the process of press forming originated from a blank plate.

The floor structure disclosed in Patent Literature 3 may not only complicate the geometry of the side sill inner panel and the floor cross member, but may even disable the vehicle body from being assembled in some kinds of process of assembling by spot welding, possibly needing a vast change in assembly process of vehicle body.

The floor structure disclosed in Patent Literature 4 inevitably increases the manufacturing cost, due to complicated process of forming of the side sill inner panel.

In addition, although not clearly stated, the floor cross members in the floor structures disclosed in Patent Literatures 1 to 4, filed in 1988 to 1994, are products of the era wherein the high tensile strength steel was not so popularly used. From this point of view, all products are considered to be made of common steel sheet having a tensile strength of 300 to 340 MPa or around, rather than the high tensile strength steel.

Accordingly, even with these inventions, there will be no other choice than providing the flanges at around the ridge part, at both longitudinal ends of the floor cross member made of a high tensile strength steel having a tensile strength of 390 MPa or larger.

It is therefore an object of the present invention to provide a vehicle body which has a longitudinal member, and a widthwise member joined through a flange formed at the axial end thereof to the longitudinal member, which is suppressed in deformation of the widthwise member, and is improved in the torsional rigidity.

More specifically, the present invention is directed to provide a vehicle body having, for example, a front floor panel, and a floor cross member which is joined to the top surface of the front floor panel, and connects the tunnel part of the front floor panel and the side sill joined to the front floor panel, having all characteristics of high rigidity, good load transmission performance, and lightness of weight.

Solution to Problem

The present invention, is enumerated below.

[1] A vehicle body which includes a longitudinal member disposed as aligned in the front-back direction of the vehicle body, and a widthwise member disposed as aligned in the widthwise direction of the vehicle body,
the widthwise member having at least a web surface which configures the top surface, a ridge part contiguous to the web surface, and a vertical wall surface contiguous to the ridge part,
the widthwise member having a flange formed at the longitudinal end continuously around at least the web surface, the ridge part and the vertical wall surface, and being connected through the flange to the longitudinal member,
the flange having a flange width $l_{fc}$, at the center in the perimeter direction of the curved part thereof, being not smaller than the minimum flange width $l_{fs}$ in the region excluding the center in the perimeter direction of the curved part, and
the widthwise member having a tensile strength of 440 MPa or larger.
[2] The vehicle body of [1], wherein the widthwise member is a press-molded body having a ditch-like transverse cross-sectional shape.
[3] The vehicle body of [1], wherein the ridge part has a radius of curvature R of 8 mm or larger, and the radius of curvature R (mm) and the height H (mm) of the transverse cross-sectional shape of the widthwise member satisfy the relational expression (1) below:

$$0.06 \le R/H \le 0.25 \tag{1}$$

[4] The vehicle body of [1], wherein the flange width $l_{fc}$ at the center in the perimeter direction of the curved part, and the minimum flange width $l_{fs}$ in the region excluding the center in the perimeter direction of the curved part, satisfy the relational expression (2) below:

$$l_{fc}/l_{fs} \ge 1.05 \tag{2}$$

[5] The vehicle body of [1], wherein the angle formed between the web surface and the vertical wall surface is 80° or larger and 100° or smaller.
[6] The vehicle body of [1], wherein the curved part has a joint part to be joined with the longitudinal member.
[7] The vehicle body of [6], wherein the joint part falls in a range projected on the flange, the range being determined, when viewed in a transverse cross-section of the widthwise member at around the flange, by a normal line inclined by a predetermined angle away from the normal line on the web surface at around the boundary between the web surface and the ridge part, and by a normal line inclined by a predetermined angle away from the normal line on the vertical wall surface at around the boundary between the vertical wall surface and the ridge part.

[8] The vehicle body of [6], wherein the joint part is a spot-welded part.

[9] The vehicle body of [1], wherein the flange does not have a minimum thickness in a portion of the curved part, which is corresponded to the center in the perimeter direction of the ridge part.

[10] A vehicle body which includes:
a front floor panel which has a tunnel part with a vertical wall, nearly at the center of the widthwise direction, and has flange parts at both widthwise edges;
a side sill joined through the flange part to the front floor panel; and
a floor cross member which has at least a web surface which configures the top surface, a ridge part contiguous to the web surface, and a vertical wall surface contiguous to the ridge part, and is joined to the top surface of the front floor panel,
the floor cross member having the flanges formed at both longitudinal ends continuously around at least the web surface, the ridge part and the vertical wall surface, and being connected through the flanges to the vertical wall and to the side sill,
the flange having a flange width $l_{fc}$, at the center in the perimeter direction of the curved part thereof, being not smaller than the minimum, flange width $l_{fs}$ in the region excluding the center in the perimeter direction of the curved part, and
the floor cross member having a tensile strength of 440 MPa or larger.

[11] The vehicle body of [10], wherein the floor cross member is a press-molded body having a ditch-like transverse cross-sectional shape.

[12] The vehicle body of [10], wherein the ridge part has a radius of curvature R of 8 mm or larger, and the radius of curvature R (mm) and the height H (mm) of the transverse cross-sectional shape of the floor cross member satisfy the relational expression (1) below:

$$0.06 \leq R/H \leq 0.25 \quad (1)$$

[13] The vehicle body of [10], wherein the flange width $l_{fc}$ at the center in the perimeter direction of the curved part, and the minimum flange width $l_{fs}$ in the region excluding the center in the perimeter direction of the curved part, satisfy the relational expression (2) below:

$$l_{fc}/l_{fs} \geq 1.05 \quad (2)$$

[14] The vehicle body of [10], wherein the angle formed between the web surface and the vertical wall surface is 80° or larger and 100° or smaller.

[15] The vehicle body of [10], wherein the curved part has a joint part to be joined with the vertical wall or the side sill.

[16] The vehicle body of [15], wherein the joint part falls in a range projected on the flange, the range being determined, when, viewed in a transverse cross-section of the floor cross member at around the flange, by a normal line inclined by a predetermined angle away from the normal line on the web surface at around the boundary between the web surface and the ridge part, and by a normal line inclined by a predetermined angle away from the normal line on the vertical wall surface at around the boundary between the vertical wall surface and the ridge part.

[17] The vehicle body of [15], wherein the joint part is a spot-welded part.

[18] The vehicle body of [10], wherein the flange does not have a minimum thickness in a portion of the curved part, which is corresponded to the center in the perimeter direction of the ridge part.

Advantageous Effects of Invention

According to the present invention, successfully provided is a vehicle body which has a longitudinal member, and a widthwise member joined through a flange formed at the axial end thereof to the longitudinal member, which is suppressed in deformation of the widthwise member, and is improved in the torsional rigidity.

According to the present invention, also successfully provided is a vehicle body having, for example, a front floor panel, and a floor cross member which is joined to the top surface of the front floor panel, and connects the tunnel part of the front floor panel and the side sill joined to the front floor panel, being optimized in the geometry of the floor cross member, form and condition of joining between the floor cross member and the side sill or the tunnel part, and thereby having all characteristics of high rigidity, good load transmission performance, and lightness of weight.

BRIEF DESCRIPTION OF DRAWINGS

FIG. 1A is a perspective view partially illustrating a floor structure of a vehicle body according to an embodiment.

FIG. 1B is a drawing partially illustrating a flange part of a floor cross member of an embodiment.

FIG. 1C is a drawing partially illustrating a flange part of a conventional floor cross member.

FIG. 2A is a or cross-sectional view taken along line II-II in FIG. 1A.

FIG. 2B is a transverse cross-sectional view schematically illustrating an exemplary floor cross member.

FIG. 3C is a drawing illustrating a flange and joint parts of a floor cross member of an embodiment.

FIG. 3D is a drawing illustrating a flange and spot-welded parts of a floor cross member of an embodiment

FIG. 5A is a drawing schematically illustrating a method of forming a floor cross member.

FIG. 5B is a drawing schematically illustrating a method of forming a floor cross member.

FIG. 17B is a drawing illustrating layouts of the spot-welded points in model 1 to model 3.

FIG. 18 is a drawing illustrating layouts of the spot-welded points in models 2, 7, 3, 9, 10 and 16.

FIG. 19 is a drawing illustrating layouts of the spot-welded points in models 2, 11 and 12.

FIG. 22 is a graph illustrating torsional rigidity of models 4 and 6.

FIG. 23 is a graph illustrating torsional rigidity of models 6 and 5.

FIG. 29 is a graph illustrating torsional rigidity of models 3 to 15.

FIG. 30 is a drawing illustrating layouts of the spot-welded points in models 16 and 17.

DESCRIPTION OF EMBODIMENTS

Figure 3A:
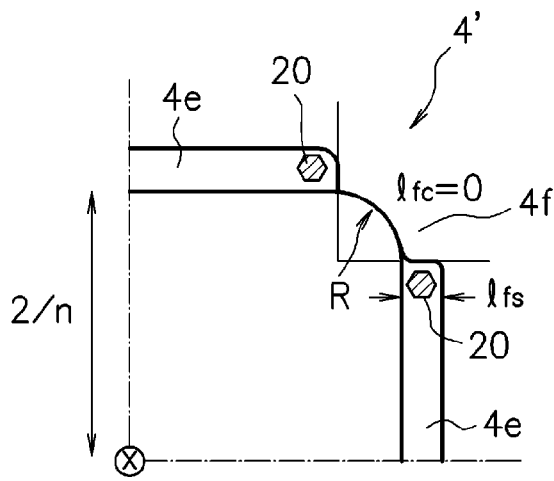
FIG. 3A is a drawing illustrating a flange and spot-welded parts of a conventional floor cross member.

An embodiment, for carrying out the present invention will be explained below, referring to the attached drawings. This embodiment exemplifies a case where the longitudinal member is configured by the side sill and the tunnel part of the front floor panel, and the widthwise member is configured by the floor cross member. Note, however, that the present invention is not limited thereto, and is also applicable to a case where, for example, the longitudinal member is configured by a roof rail, and the widthwise member is configured by a roof cross member.

FIG. 1A is a perspective view partially illustrating a floor structure $1a$ of a vehicle body 1 according to this embodiment. As seen in FIG. 1A, the floor structure $1a$ of the vehicle body 1 has a front floor panel 2, a side sill 3 as the longitudinal member, and a floor cross member 4 as the widthwise member.

The front floor panel 2 has a tunnel part $2a$ as the longitudinal member, and a flange part $2b$. The tunnel part $2a$ has a vertical wall $2c$, and is formed at around the center, in the widthwise direction of vehicle body, of the front floor panel 2, so as to bulge to give a ditch-like transverse cross-sectional shape. Inside (below the bottom surface) the tunnel part $2a$, a propeller shaft for transmitting engine output to the rear wheels, and various pipings are housed. The flange part $2b$ is formed upright at each of both widthwise edges of the front floor panel 2.

General levels of strength and thickness of the front floor panel 2 will suffice. For example, the tensile strength is typically 300 MPa or around, and the thickness is typically 0.6 to 0.7 mm or around.

The side sill 3 is a long cylindrical body configured by a side sill inner panel $3a$ and a side sill outer panel $3b$. The side sill inner panel $3a$ and the side sill, outer panel $3b$ are joined to each other typically by spot welding, using flanges respectively formed at the end parts of both components.

The side sill inner panel $3a$ is joined on the outer surface thereof to the flange part $2b$ of the front floor panel 2, typically by spot welding.

General levels of strength and thickness of the side sill inner panel $3a$ and the side sill outer panel $3b$ will suffice. For example, the tensile strength is typically 440 to 980 MPa or around, and the thickness is typically 1.0 to 2.0 mm or around.

FIG. 2A is a cross-sectional view taken along line II-II in FIG. 1A. As seen in FIG. 1A and FIG. 2A, the floor cross member 4 is a press-molded body composed of high tensile strength steel having a tensile strength of 440 MPa or larger, has a web surface $4a$ as the top surface, ridge parts $4b$, $4b$ contiguous to web surface $4a$, and vertical wall surfaces $4c$, $4c$ contiguous to the ridge parts $4b$, $4b$, and has a ditch-like transverse cross-sectional shape tapered to give nearly a trapezoidal form. The floor cross member 4 also has flanges $4d$, $4d$ which are contiguous to the vertical wall surfaces $4c$, $4c$ and protrude sideward.

The floor cross member 4 is joined through the flanges $4d$, $4d$ to the top surface $2d$ of the front floor panel 2, typically by spot welding.

The floor cross member 4 additionally has flanges $4e$. As seen in FIG. 1B, the flanges $4e$ are formed at around both longitudinal ends of the floor cross member 4, continuously along the web surface $4a$, the ridge parts $4b$, $4b$ and vertical wall surfaces $4c$, $4c$. In other words, there is no notch $4f$ as seen in FIG. 1C, which has been indispensable for a conventional floor cross member 4' composed of high tensile strength steel having a tensile strength of 390 MPa or larger.

The floor cross member 4 preferably has a tensile strength of 440 MPa or larger, and more preferably 590 MPa or larger. By the selection, the floor cross member 4 may be thinned, and the vehicle body may be reduced in weight. The floor cross member 4 preferably has a thickness of 1.0 to 2.0 mm for example, more preferably 1.6 mm or smaller, and furthermore preferably 1.4 mm or smaller.

The transverse cross-sectional shape of the floor cross member 4 is not limited thereto, and may be a shape, as typically Illustrated in FIG. 2B, with the web surface 4a inclined away from the horizontal line.

The angle θ formed between the web surface 4a and the vertical wall surface 4c is preferably 80° or larger and 100° or smaller.

If the angle θ is smaller than 80°, the torsional rigidity and the collision characteristic will become relatively low. To set the angle formed between the web surface 4a and the vertical wall surface 4c to 80° or larger is one of conditions for maximizing an effect of omission of notch, and for enabling the omission of notch. In this way, the flanges 4e may be formed by press forming, at both longitudinal ends of the floor cross member 4 composed of high tensile strength steel having a tensile strength of 440 MPa or larger.

On the other hand, press forming of the floor cross member 4 becomes difficult if the angle θ exceeds 100°.

The ridge part 4b preferably has a radius of curvature of 8 mm or larger. The radius of curvature R (mm), and the height H (mm) of the ditch-like transverse cross-sectional shape, tapered to give a nearly trapezoidal form, preferably satisfy 0.06≤R/H≤0.25, and more preferably 0.06≤R/H≤0.185.

The reason why the ridge part 4b preferably has a radius of curvature of 8 mm or larger is that, if the radius of curvature R of the ridge part 4b is smaller than 8 mm, the flange 4e may have crack or other defect at the edge thereof in the process of press forming. While the radius of curvature of the ridge part has generally been, set to 3 to 5 mm or around, the flange would have a large strain at the edge thereof under the radius of curvature of 3 to 5 mm or around, so that there has been no other choice than providing the notch, rather than the flange, at around the ridge part.

Figure 11:
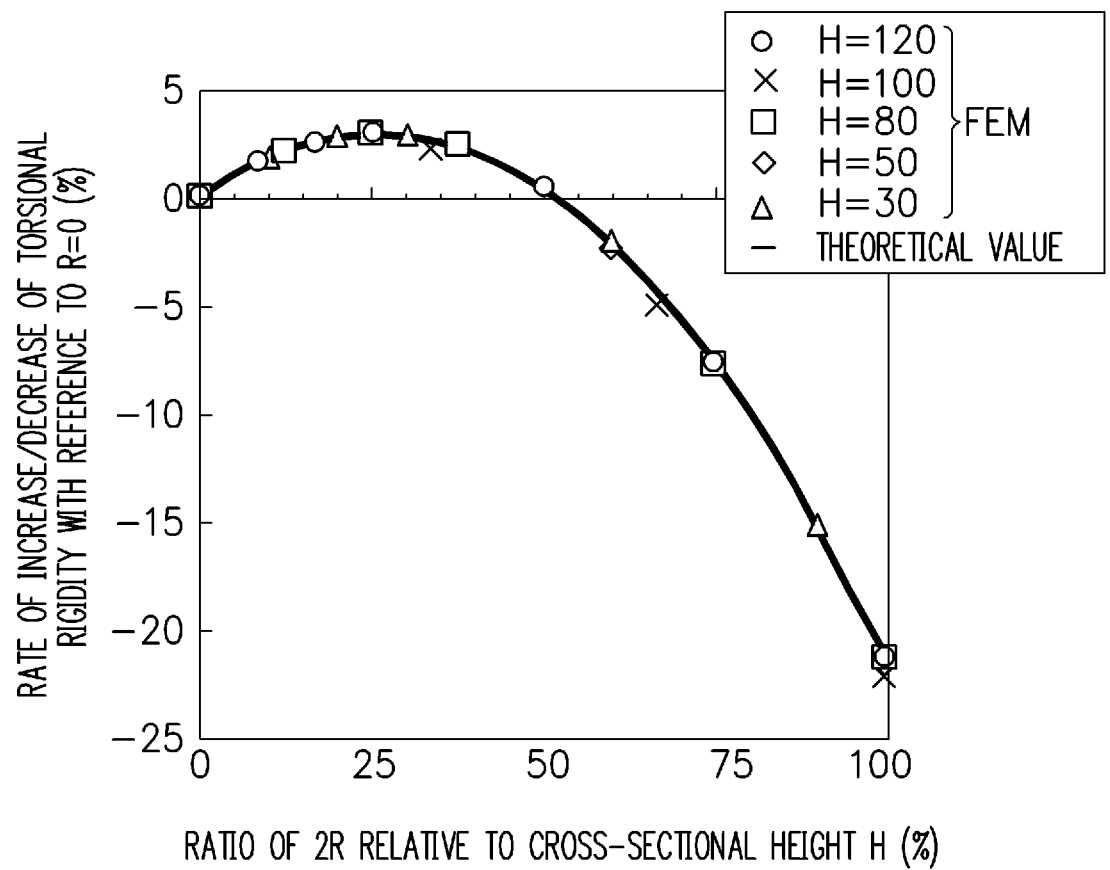
FIG. 11 is a graph illustrating rate of increase/decrease of torsional rigidity, with reference to the torsional rigidity under a radius of curvature R of 0 mm, when measured for every ratio of 2R relative to the cross-sectional height H.

The reason why the condition of 0.06≤R/H≤0.25 is preferred may be explained based on the results illustrated in the graph of FIG. 11. FIG. 11 is a graph illustrating rate of increase/decrease of torsional rigidity, with reference to the torsional rigidity under a radius of curvature R of 0 mm, when measured for every ratio of 2R relative to the cross-sectional height H. If the condition of 0.12≤2R/H≤0.50, or 0.06≤R/H≤0.25, is satisfied, the torsional rigidity may be increased above that expected from the shape with a radius of curvature R of 0 mm.

By satisfying the 0.06≤R/H≤0.25, the radius of curvature R of the ridge part 4b increases from the conventional one, thereby the stretch, flanging during the press forming may be moderated to suppress the tensile strain possibly occurs at the edge of flange 4e. Accordingly, cracking is certainly prevented, from occurring in the process of manufacturing, by press forming, of the floor cross member 4 having the flanges 4e formed on both longitudinal ends, and thereby the flanges 4e are formed in a more reliable manner at both longitudinal ends of the floor cross member 4.

The reason why a range of 0.06≤R/H≤0.185 is preferred, is that the torsional rigidity may be increased as compared with the conventional general floor cross member. The conventional general floor cross member has a radius of curvature R of the ridge part of 3 to 5 mm or around, and a cross-sectional height R of 100 mm or around. If the range 0.12≤2R/H≤0.37, or 0.06≤R/H≤0.185 is satisfied, the torsional rigidity may be increased as compared, with that of a floor cross member typically having a radius of curvature R of 5 mm, and a cross-sectional height H of 100 mm (2R/H=10%).

The flanges 4e, 4e formed on the floor cross member 4 has, as illustrated in FIG. 1B, straight parts 4e-1, 4e-1 which extend along the web surface 4a and the vertical wall surface 4c, and a curved part 4e-2 which extends along the ridge part 4b.

Figure 3B:
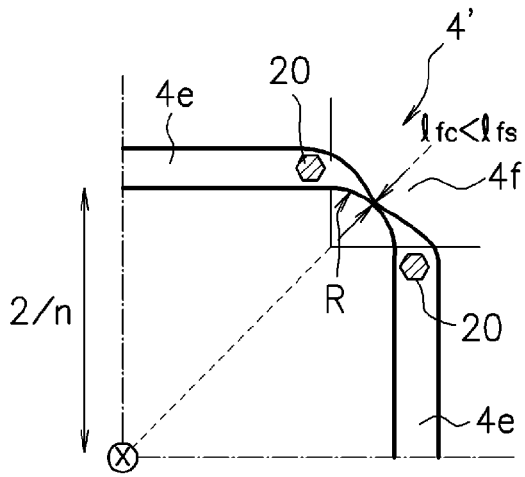
FIG. 3B is a drawing illustrating a flange and joint parts of a conventional floor cross member.

FIG. 3A and FIG. 3B are drawings illustrating the flange 4e and a joint part 20 of a conventional floor cross member 4' when viewed in the axial direction. On the other hand, FIG. 3C and FIG. 3D are drawings illustrating the flange 4e and the joint part 20 of a floor cross member 4 of an embodiment.

As seen in FIG. 1B, FIG. 3C and FIG. 3D, a joint part (spot-welded part) 20 for connection with the vertical wall 2c or with the side sill inner panel 3a is designed to fall in the curved part 4e-2. While at least one joint part 20 fails in the curved part 20 as illustrated in FIG. 3C, the joint part 20 may alternatively fall, as illustrated in FIG. 3D, on the boundary between the straight part 4e-1 and the curved part 4e-2, so as to lie across both parts. Through the joint part 20, the floor cross member 4 is joined with the front floor panel 2 or the side sill 3.

By such provision of the joint part 20 to the curved part 4e-2 of the flange 4e, the floor cross member 4 and the vertical wall 2c or the side sill inner panel 3a are tightly joined, and thereby the vehicle body 1 may be improved in. the rigidity of the floor structure and the load transmission performance under impact load.

Moreover, as illustrated in FIG. 3C and FIG. 3D, the flange 4e has a flange width $l_{fc}$ at the center in the perimeter direction of the curved part 4e-2 thereof, which is not smaller than the minimum, flange width $l_{fs}$ in the region excluding the center in the perimeter direction of the curved part 4e-2. Note that, in this specification, "the center in the perimeter direction of the curved part" does not mean the exact half of center angle α (see FIG. 4, for example) of the curved part 4e-2, but typically means an approximately α±5% range which ranges on both sides of the center (exact center) in the perimeter direction of the curved part 4e-2. For example, the flange width $l_{fc}$ is defined to be the minimum width in a ±5% range on both sides of the center.

As described above, low ductility as compared with that of low-strength steel sheet and poor formability are problems of the high tensile strength steel to be applied to automobile components. For application of the high tensile strength steel, it is therefore effective to simplify the geometry of the components, and especially to find a geometry having no portion affected by stretch flanging.

Simplified geometry of the components may, however, degrade various performances including the above-described collision characteristic, and torsional rigidity and flexural rigidity of the vehicle body.

As illustrated in FIG. 1C and FIG. 3A, the floor cross member 4', intended to be applied with high tensile strength steel, barely ensures a necessary level of formability at present by providing the notch 4f to the flanges 4e formed at the longitudinal ends, so as to give a geometry having no portion affected by stretch flanging. Since this sort of notch 4f is provided along the ridge part 4b, so that, if the radius of curvature R of the ridge part 4b is large, a region of the notch 4f inevitably increases as a consequence. For this reason, the radius of curvature R of the ridge part 4b of the floor cross member 4 at present is limited to a small value of 3 to 5 mm or around.

Even for the case where, as illustrated in FIG. 3B, the flange 4e remains along the ridge part 4b, a necessary level of formability is barely ensured by limiting the flange width $l_{fc}$ at the center in the perimeter direction of the curved part 4e-2 to the minimum width (i.e., $l_{fc}<l_{fs}$), so as to assume a geometry having no portion affected by stretch flanging.

The floor structure 1a of the vehicle body 1 is required to have a high level of shock absorbing performance for protecting the crew in case of side impact, similarly as required for the side sill 3 illustrated in FIG. 1A. In particular, the floor cross member 4 is a component for which shock absorbing performance in the initial stage of impact in an axial (in the direction of vehicle width) collapse mode.

If the torsional rigidity and flexural rigidity of the vehicle body are poor, the vehicle body will cause elastic deformation due to reaction force input from road, surface to the driving vehicle, so that the road-gripping ability of tire will no longer meet the design goal, and driving stability of the vehicle will degrade. Accordingly, the floor cross member 4 disposed nearly at the longitudinal center of the vehicle body is also required to improve the torsional rigidity of the vehicle body.

Figure 4A:
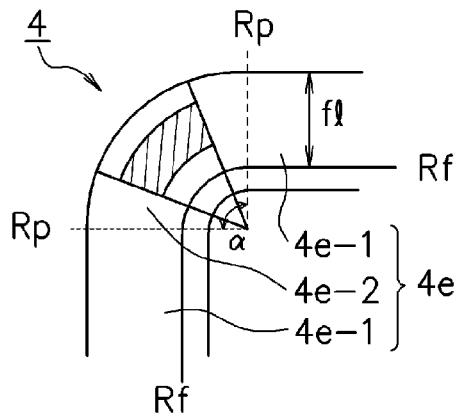
FIG. 4A is a drawing illustrating straight parts and a curved part of a flange formed in the floor cross member.
Figure 4B:
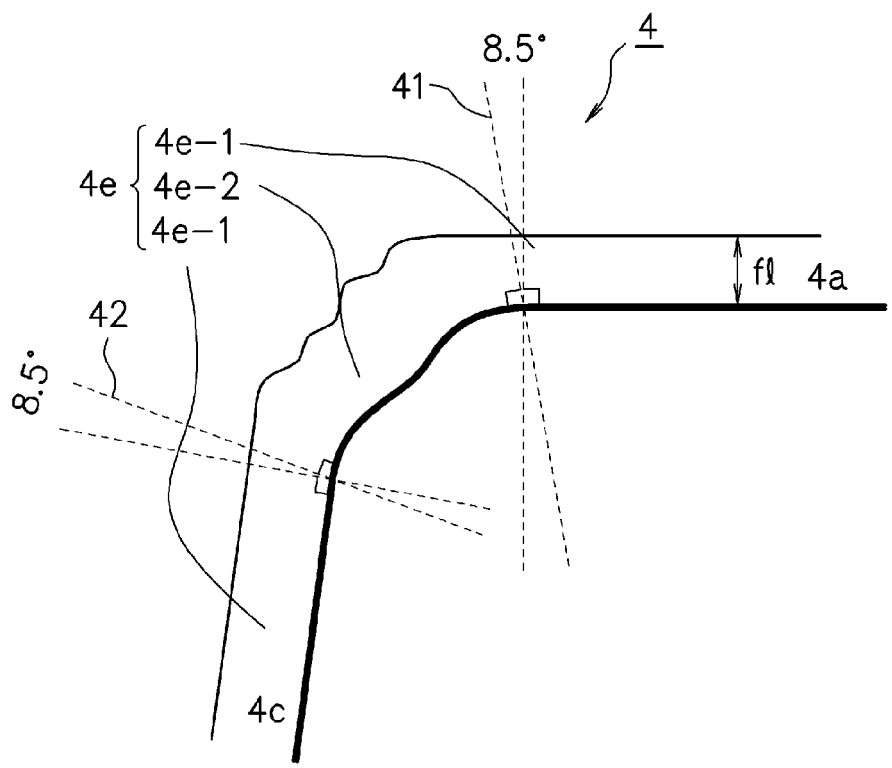
FIG. 4B is a drawing illustrating straight parts and a curved part of a flange formed in the floor cross member.

FIG. 4A and FIG. 4B are drawings illustrating the straight parts 4e-1, 4e-1 and the curved part 4e-2 of the flange 4e formed in the floor cross member 4. In FIG. 4A, symbol Rp represents the start point and the end point of the curved part 4e-2, and symbol Rf represents a curve indicating position of rising of the flange 4e. Note that FIG. 4A illustrates a case where the straight parts 4e-1, 4e-1 and the curved part 4e-2 have the same flange width.

As seen in FIG. 4A, the joint part is preferably provided, in a region of the curved part 4e-2 which satisfies ¼ to ¾ of the center angle α (deg.) of the curved part 4e-2, and also satisfies 1/10 to 9/10 of the flange width fl (mm.) (hatched area in FIG. 4A).

Methods of joining are exemplified by electric resistance welding such as spot welding, various types of laser welding, and bonding, wherein spot welding is preferable from the viewpoint of cost.

If the curved part 4e-2 is not clearly determined, a point to be spot-welded is determined as illustrated in FIG. 4B. FIG. 4B illustrates a case where the angle θ between the web surface 4a and the vertical wall surface 4c is approximately 85°, with a fluctuating radius of curvature in the curved part 4e-2, and with a non-uniform flange width.

The point to be spot-welded is determined as follows. In the transverse cross-section of the floor cross member 4 in the vicinity of the flange 4e-2, at around the boundary between the web surface 4a and the ridge part 4b, a normal line 41, which inclines a predetermined angle (for example, an angle equal to 10% of θ ( (=8.5°)) away from the normal line on the web surface 4a, is found. Similarly, at around the boundary between the vertical wall surface 4c and the ridge part 4b, a normal line 42, which inclines a predetermined angle (for example, an angle equal to 10% of θ (=8.5°)) away from the normal line on the vertical wall surface 4c, is found. The spot welding is given in an area of the flange 4e projected from the area bounded by these two normal lines 41, 42. While the predetermined angle was given as 10% of θ, an effective point to be spot-welded may be determined even if the curved part 4e-2 is ambiguous, by determining the predetermined angle in a 10±2% range of θ.

Next, a method of forming the floor cross member 4 will be explained.

FIG. 5A and FIG. 5B are drawings schematically illustrating methods of forming the floor cross member 4.

The methods of forming the floor cross member 4 are selected from a method illustrated in FIG. 5A, based on deep drawing, trimming of excessive materials and raising the flange 4e; and a method illustrated in FIG. 5B, based on bending of a blank with a developed shape. However, any effort of obtaining the continuous flange 4e having the curved part 4e-2 and an appropriately large flange width will naturally produce cracks in the curved part 4e-2 due to stretch flanging and wrinkles at the base, failing to obtain a desired geometry. Moreover, many of current general methods of forming select bending, from the viewpoint of improving the material yield. In this case, cracking in the stretched flange part will be an issue to be solved.

When, bending is selected, a blank having a developed shape of product is preferably used, since bending gives smaller material stretch than in drawing.

Figure 6A:
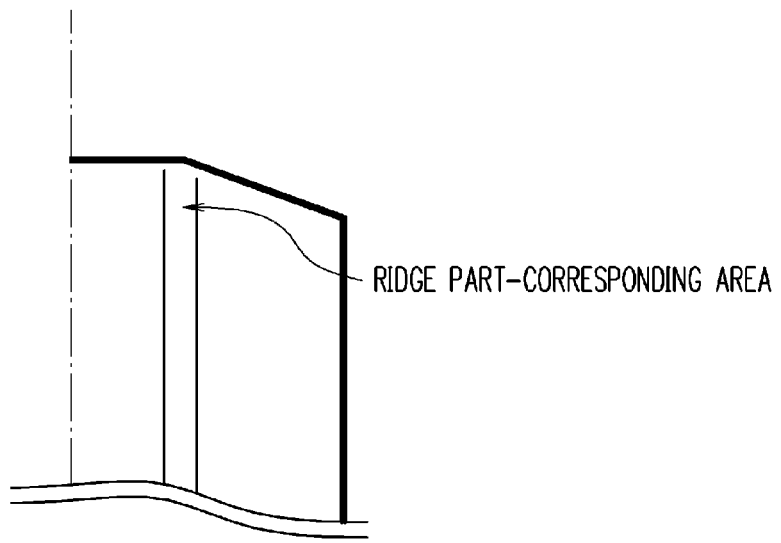
FIG. 6A is a drawing for explaining a conventional blank shape.
Figure 6B:
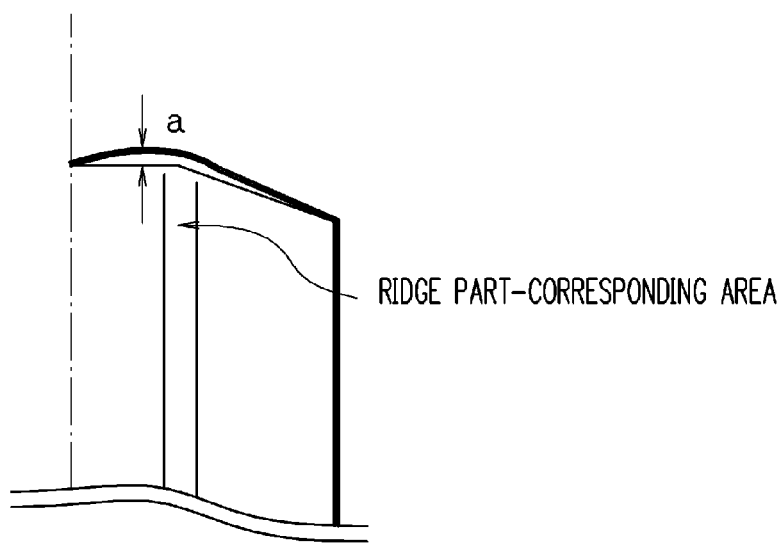
FIG. 6B is a drawing for explaining a strain-distributed blank shape.

FIG. 6A is a drawing for explaining a conventional blank shape, and FIG. 6B is a drawing for explaining a geometry of strain-distributed blank.

In order to form the flange 4e having an appropriately large length around the whole perimeter of the ridge part 4b, it is preferable to use a strain-distributed blank shape illustrated in FIG. 6B, in which an excessive geometrical margin "a" is additionally provided to the developed blank shape of the floor cross member 4, specifically in a flange-corresponding area along a ridge part-corresponding area (area finally formed into the ridge part 4b). By using the strain-distributed blank shape provided with the excessive geometrical margin "a", the curved part 4e-2 may be prevented from being localized with stretch flanging.

Figure 7:
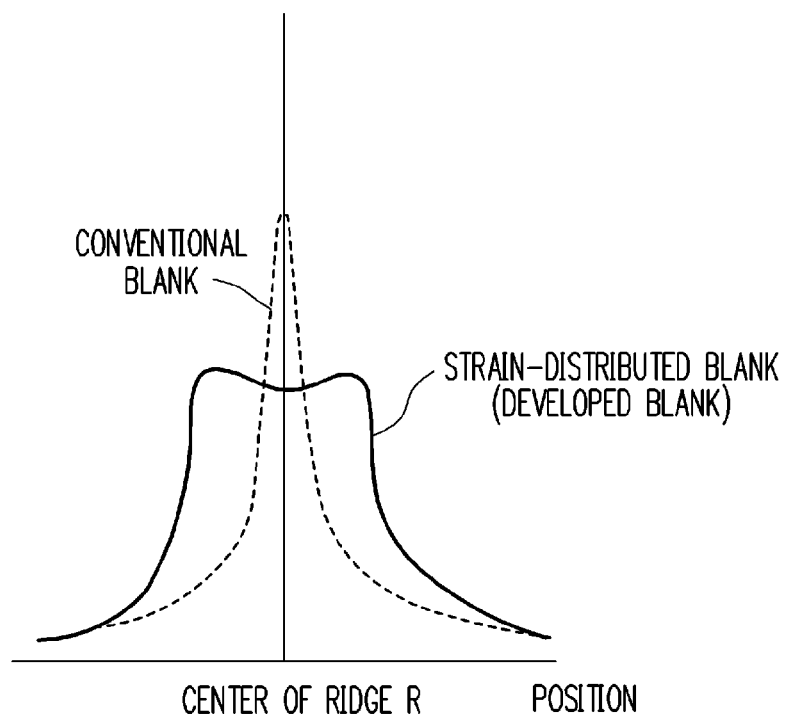
FIG. 7 is a graph illustrating an exemplary relation between position in the curved part of the flange and strain.

FIG. 7 is a graph illustrating an exemplary relation between position in the curved part 4e-2 of the flange 4e and strain. The abscissa of FIG. 7 represents position on the flange edge, and the ordinate represents rate of decrease of flange thickness.

As seen in FIG. 7, by using the strain-distributed blank shape (developed blank), the deformation is suppressed from being localized, thereby a good result of formation may be obtained in the stretch-flanged part with a distributed deformation (distributed strain). When the conventional blank is used, the flange tends to be thinned locally in an area of the curved part 4e-2 corresponded to the center in the perimeter direction of the ridge part 4b (see the broken line in FIG. 7). In contrast, when the strain-distributed blank is used, the flange will not be maximally thinned in an area of the curved part 4e-2 corresponded to the center in the perimeter direction of the ridge part 4b (see the solid line in FIG. 7).

The excessive geometrical margin "a" is preferably set to satisfy $0.03(R+fl) \leq a \leq 0.5(R+fl)$, where R represents the radius of curvature of the ridge part 4b, and fl represents the flange width of the straight part 4e-1 of the flange 4e as illustrated in FIG. 4B.

By providing the excessive geometrical margin "a" of this range, rate of substantial stretch flanging at the flange edge, induced by compressive deformation at the base of rising of the flange, may be suppressed from increasing. This is because the compressive stress generates at the base, and thereby the center angle around which the ridge part is formed in the blank shape increases. In short, by providing the excessive geometrical margin "a", the substantial perimeter of the stretched flange part may increase, and thereby the deformation may be prevented from being localized.

While the embodiment described above dealt with the case where the floor cross member 4 has the ditch-like transverse cross-sectional shape, it may alternatively be a cylindrical body formable, for example, by hydroforming (with a closed transverse cross-sectional shape). In this case, the flanges may be formed at both longitudinal ends of the floor cross member so as to surround the whole perimeter, or may be formed so as to be continuous only along the web surface, the ridge part contiguous to the web surface, and the vertical wall surface contiguous to the ridge part.

Example 1

Next, results of various performance evaluations of the floor structure or vehicle body according to the present invention, analyzed, by CAE (FEM Code: LS-DYNA ver. 971), will be explained. A material model used herein was a cold-rolled steel sheet with a tensile strength of 590 MPa-class, and a thickness of 1.4 mm.

[Basic Analysis of Relation Between Geometry of Floor Cross Member and Collision Characteristic]

Figure 8A:
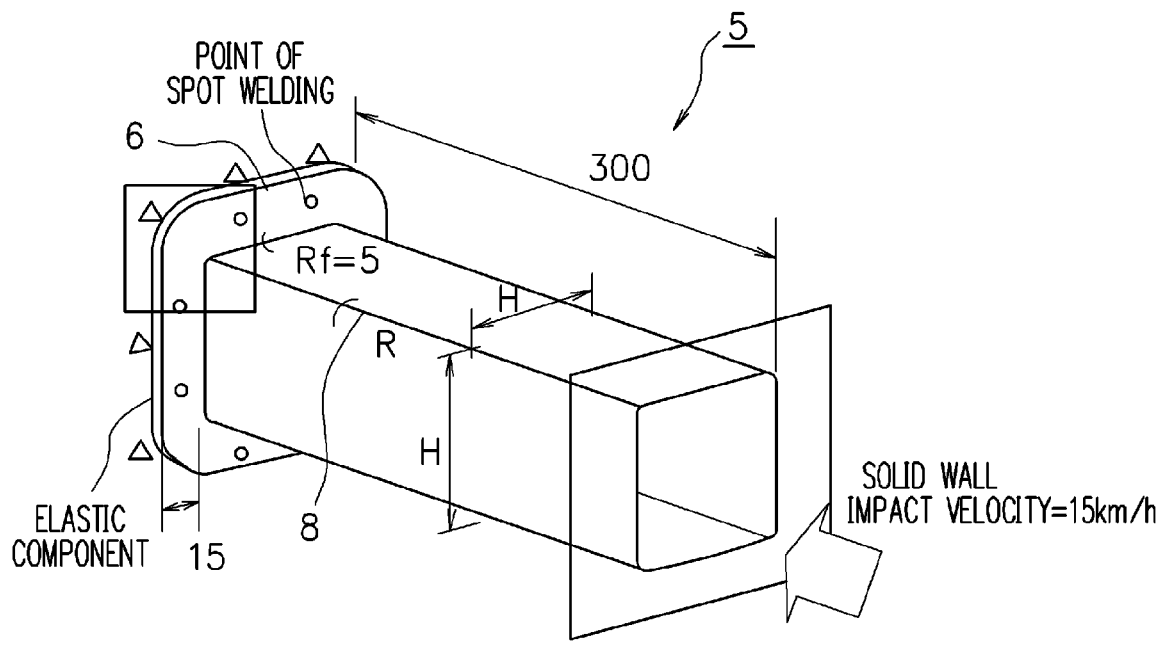
FIG. 8A is a drawing schematically illustrating an analytical model of the floor cross member.

FIG. 8A is a drawing schematically illustrating a simple shape model 5 (referred to as "analytical model 5", hereinafter) of the floor cross member 4. Axial collapse characteristics required for the floor cross member 4 were analyzed while representing it with the analytical model 5 illustrated in FIG. 8A.

Figure 8B:
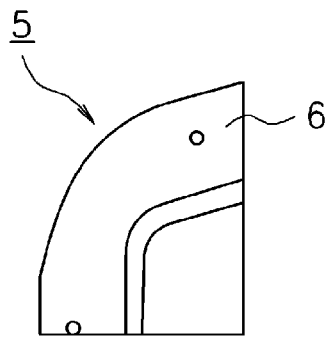
FIG. 8B is a drawing partially illustrating a flange part of the analytical model.
Figure 8C:
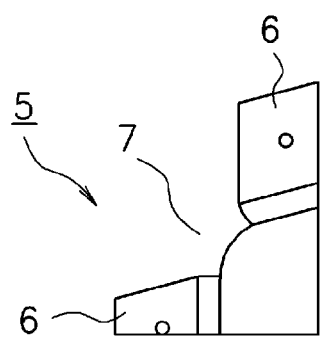
FIG. 8C is a drawing partially illustrating a flange part of the analytical model.

The analytical model 5 has cross-sectional height H=80 mm, flange width fl=15 mm, rising of flange Rf=5 mm, full length=300 mm, radius of curvature of ridge part 8 R=5, 10, 15 mm, and has a flange 6 at one longitudinal end. The flange 6 was formed to have a notch 7 in the curved part thereof for representing the conventional example (FIG. 8C), and also formed continuously around the whole perimeter without forming notch for representing the present invention (FIG. 8B), with a cross-sectional perimeter of the component as "s".

The collision characteristic was evaluated in terms of energy absorption efficiency (EA/s) at a displacement by collision of 5 mm, induced by collision at an impact velocity of 15 km/h.

Figure 9:
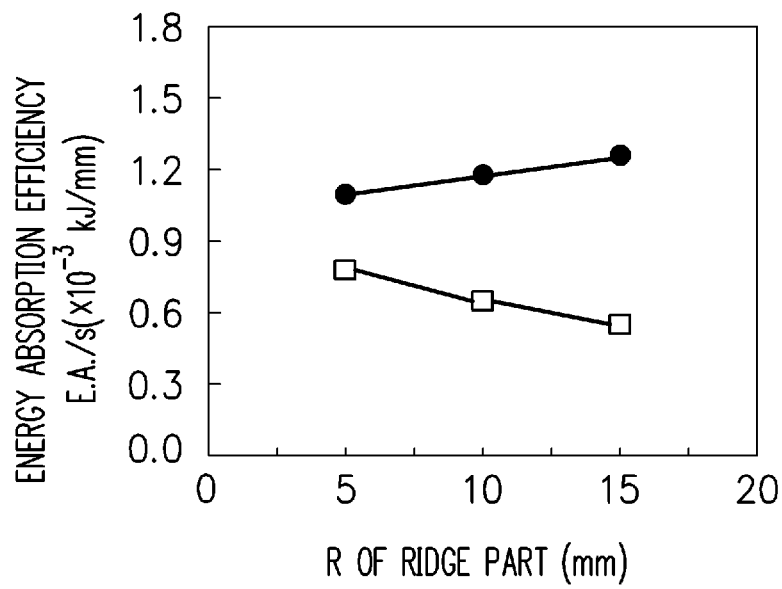
FIG. 9 is a graph illustrating relation between energy absorption efficiency under a collision displacement of 5 mm (collision characteristic) and the radius of curvature R of the ridge part.

FIG. 9 is a graph illustrating relation, between energy absorption efficiency (collision characteristic) and the radius of curvature R of the ridge part 8 under 5-mm displacement by collision. In the graph of FIG. 9, plot • represents the present invention, and plot □ represents the conventional example.

As seen in FIG. 9, the conventional example is reduced in the collision characteristic as the radius of curvature R of the ridge part 8 increases. In contrast, the present invention increases in collision, characteristic as the radius of curvature R of the ridge part 8 increases.

It is understood from the analytical results that, for the purpose of improving the collision characteristic, it is efficient to increase the radius of curvature R of the ridge part 8, and not to provide the notch to the flange 6 formed at the longitudinal end.

[Basic Analysis of Relation Between Geometry of Floor Cross Member and Torsional Rigidity]

Figure 10:
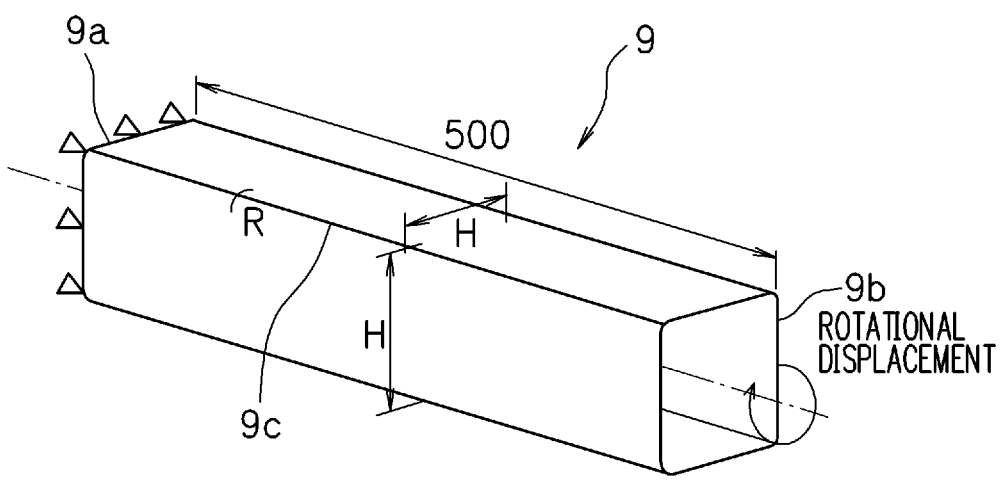
FIG. 10 is a drawing schematically illustrating an analytical model of the floor cross member.

FIG. 10 is a drawing schematically illustrating an analytical model 9 of the floor cross member 4. The torsional rigidity required for the floor cross member 4 was analyzed while representing it with the analytical model 9 illustrated in FIG. 10.

The analytical model 3 has cross-sectional height H=30 to 120 mm, full length=500 mm, and radius of curvature of ridge part $9c$ R=0 to 60 mm. Table 1 summarizes analyzed combinations of cross-sectional height H and radius of curvature R.

TABLE 1

| H (mm) | R (mm) |
|---|---|
| 30 | 0, 5, 10, 15(Circle) |
| 50 | 0, 5, 15, 25(Circle) |
| 80 | 0, 5, 10, 10, 15, 30, 40(Circle) |
| 100 | 0, 3, 5, 12, 15, 30, 45, 50(Circle) |
| 120 | 0, 3, 5, 10, 15, 30, 45, 60(Circle) |

The displacement at one end $9a$ of the analytical model 9 was completely locked, and the the other end $9b$ was applied with rotational displacement.

The torsional rigidity was evaluated in terms of moment N·m per unit angle (deg.), that is N·m/deg, which generates in the analytical model 9.

FIG. 11 is a graph illustrating analytical results of rate of increase/decrease of torsional rigidity, with reference to the torsional rigidity under a radius of curvature R of 0 mm, when studied for every ratio of 2R relative to the cross-sectional height H.

It is understood from FIG. 11 that the torsional rigidity is maximized when the radius of curvature R of the ridge part $9c$ equals to 12.5% of H, irrespective of the cross-sectional height H.

Figure 12:
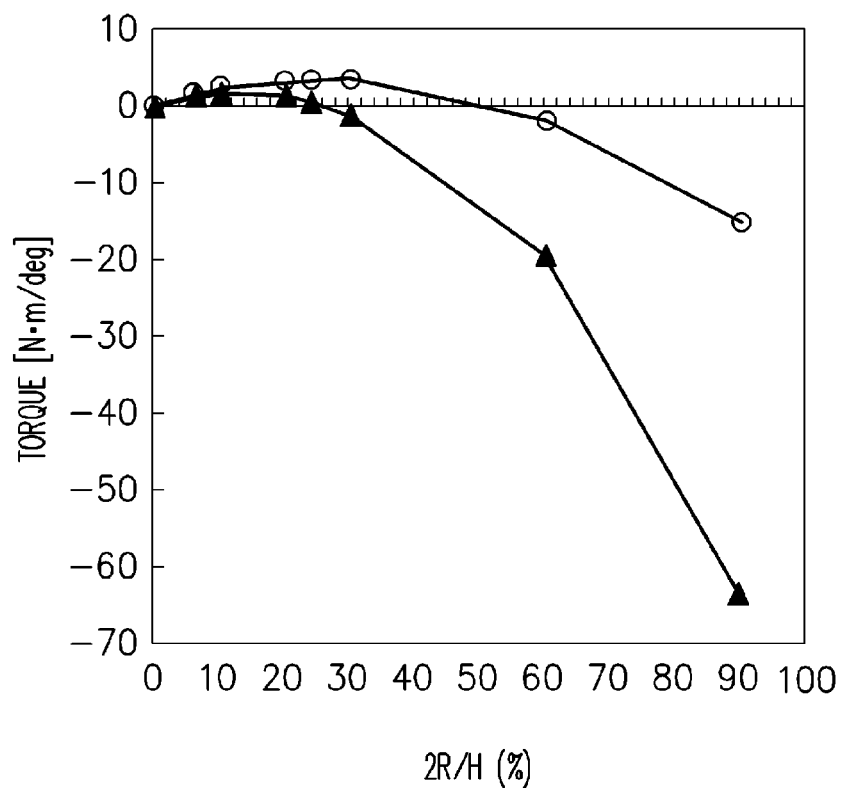
FIG. 12 is a graph illustrating influences of the radius of curvature R of the ridge part exerted on the torsional rigidity, as compared between presence and absence of a notch.

FIG. 12 is a graph illustrating influences of the radius of curvature R of the ridge part $9c$ exerted on the torsional rigidity, when compared between presence and absence of notch. The analytical model 9 (cross-sectional height H=100 mm), same as shown in FIG. 10, was used to represent the present invention. The analytical model 9 was assumed to have a flange formed continuously around the whole perimeter, although actually not provided with the flange. On the other hand, analytical model 9 was notched in the individual ridge parts $9c$, to a depth of 5 mm from the longitudinal end, to represent a conventional example. The analytical model 9 was assumed to have notches in the curved parts, although actually not provided with the flange. In the graph of FIG. 12, plot ○ represents the present invention, and plot ▲ represents the conventional example.

It is understood from FIG. 12 that the present invention attains the torsional rigidity larger than that of the conventional example with the notched flanges.

[Basic Analysis of Position of Spot Welding in Flange]

Figure 13:
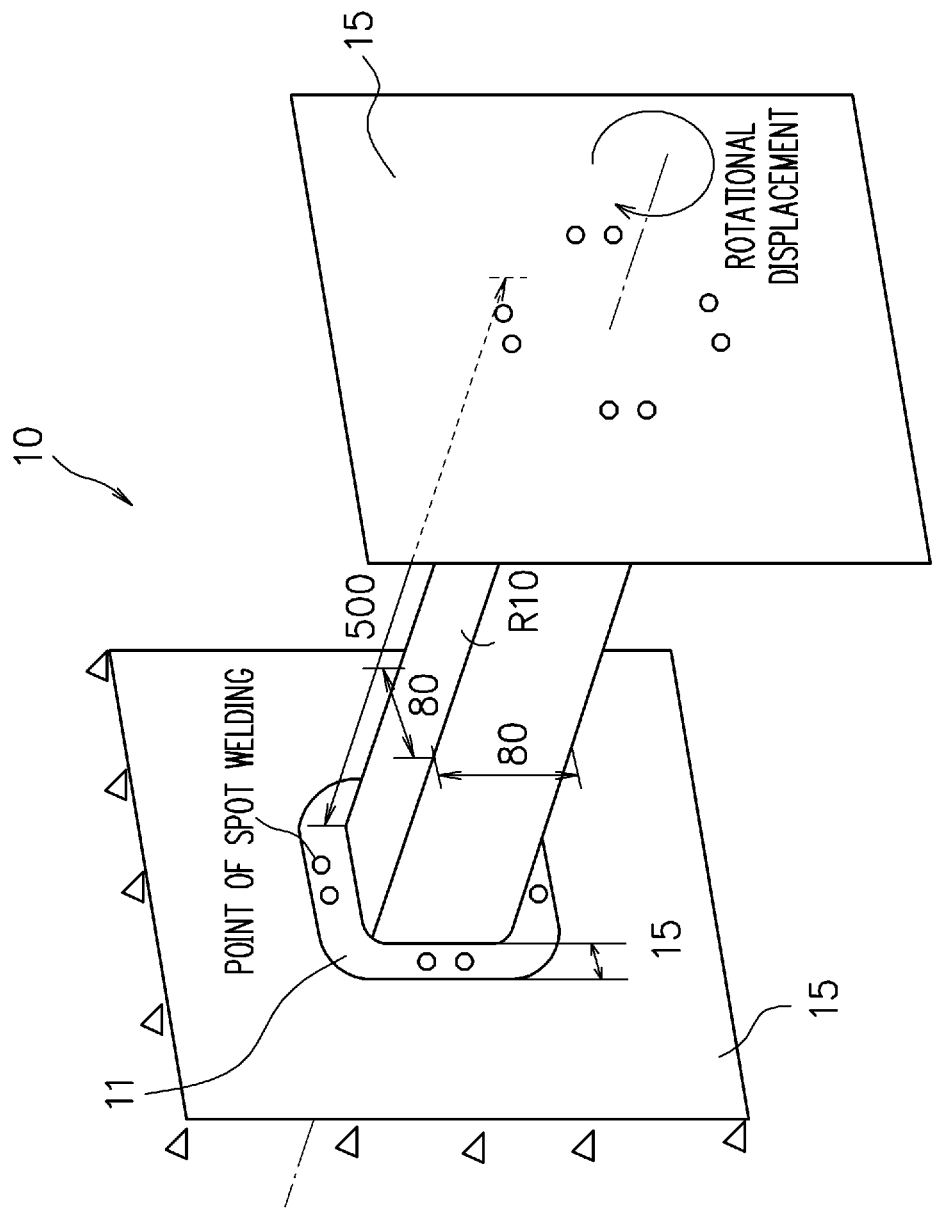
FIG. 13 is a drawing schematically illustrating an analytical model of the floor cross member.

FIG. 13 is a drawing schematically illustrating an analytical model 10 of the floor cross member 4.

The analytical model 10 has cross-sectional height H=80 mm, flange width fl=15 mm, full length=500 mm, radius of curvature of ridge part R=10 mm, and has flanges 11 at both longitudinal ends formed continuously around the whole perimeter. The individual flanges 11 were joined, by spot welding to rigid walls 15, displacement of one rigid wall 15 was completely locked, and the other rigid wall 15 was applied with rotational displacement.

Figure 14:
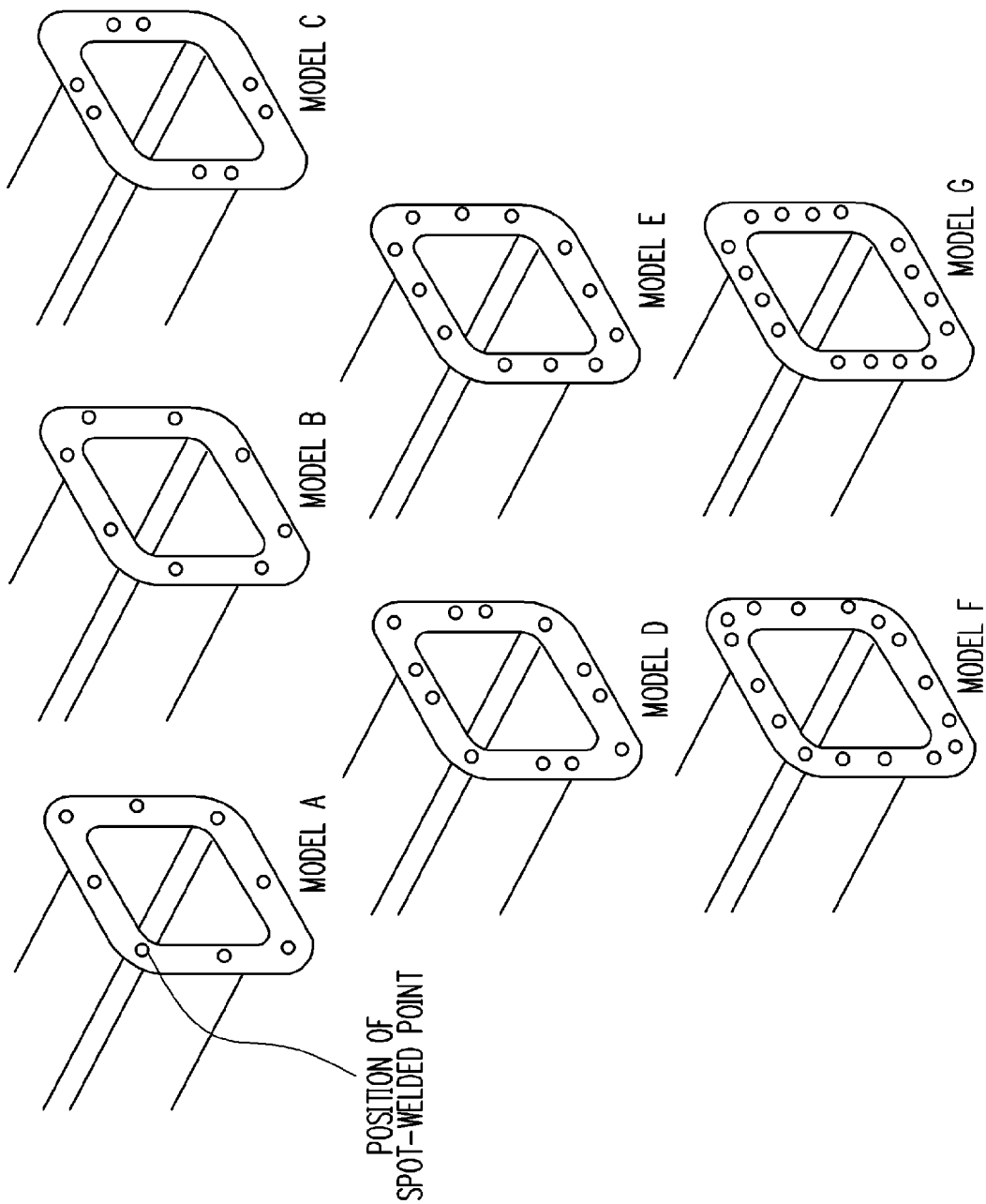
FIG. 14 is a drawing illustrating layouts of the spot-welded points in model A to model G.

FIG. 14 is a drawing illustrating layouts of the spot-welded points on the flange 11 at the end of the analytical model 10.

Model A has the spot-welded parts at the center of the individual curved parts, and at the center of the individual straight parts of the flange 11, eight spots in total.

Model B has the spot-welded parts at the boundaries between the individual curved parts and the straight parts of the flange 11, eight spots in total.

Model C has the spot-welded parts at positions trisecting the individual straight parts of the flange 11, eight spots in total.

Model D has the spot-welded parts at the center of the individual curved parts, and at positions trisecting the individual straight parts of the flange 11, twelve spots in total.

Model E has the spot-welded parts at the boundaries between the individual curved parts and the straight parts, and at the center the individual straight parts of the flange 11, twelve spots in total.

Model F has the spot-welded parts at the center of the individual curved parts, at the boundaries between the individual curved parts and the straight parts, and at the center of the individual straight parts of the flange 11, sixteen spots in total.

Model G has the spot-welded parts at the boundaries between the individual curved parts and the straight parts, and at position trisecting the individual straight parts of the flange 11, sixteen spots in total.

Figure 15:
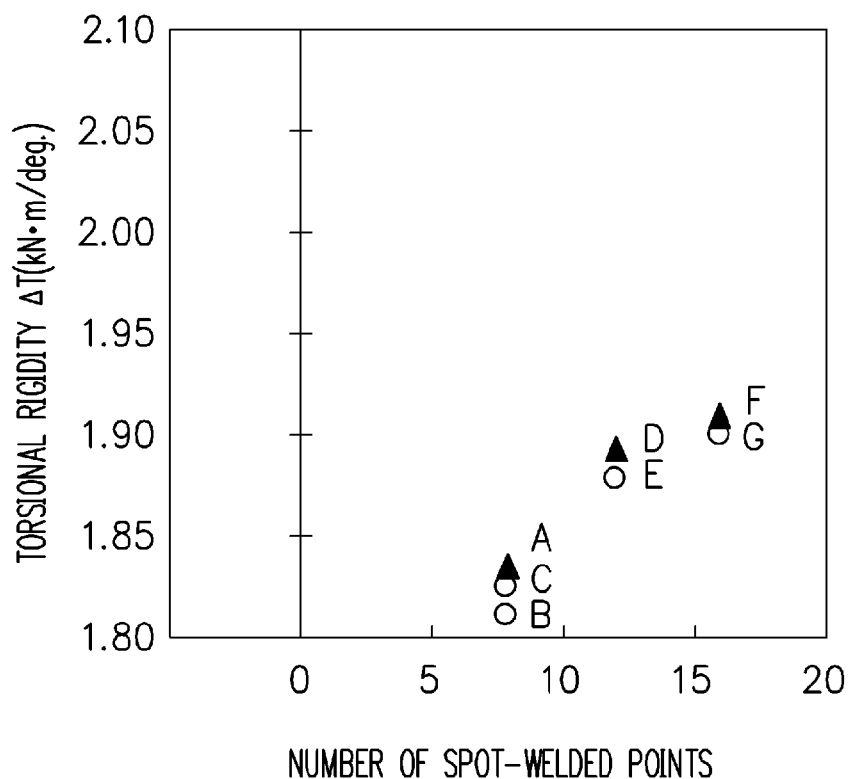
FIG. 15 is a graph illustrating relation between the torsional rigidity, and the number and position of spot-welded points affecting thereon.

FIG. 15 is a graph illustrating relation between the number and position of spot-welded points, which affects the torsional rigidity.

It was found from FIG. 15 that, when compared under the same number of spot-welded points, models A, D and F (plot ▲), having the spot-welded points in the curved parts of the flange 11 of the analytical model 10, gave the highest torsional rigidity. In short, it was found that the torsional rigidity may be improved by providing the spot-welded parts for connection with the side sill inner panel or with the tunnel part of the front floor, in the curved parts of the flange 11.

[Analytical Conditions]

Figure 16:
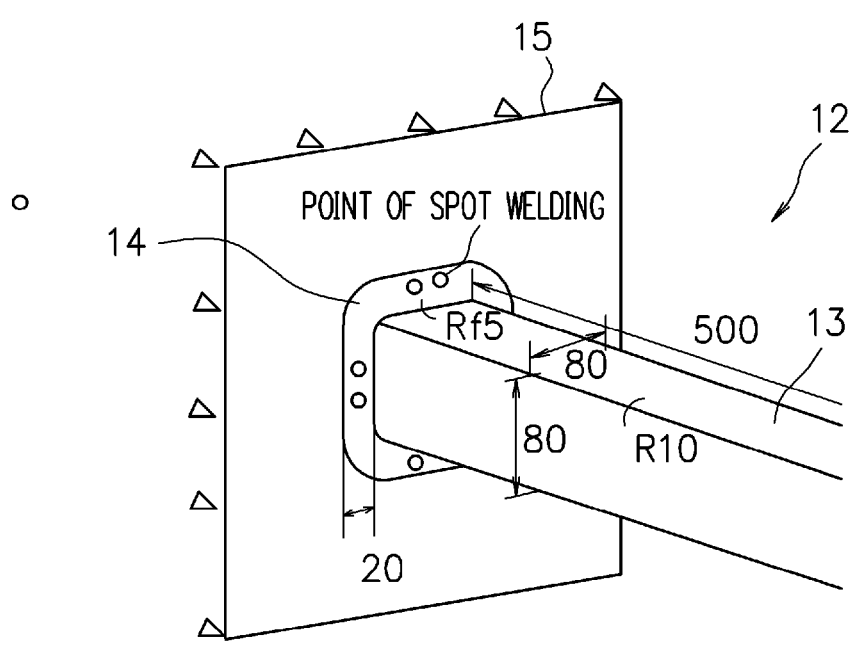
FIG. 16 is a drawing schematically illustrating an analytical model of the floor cross member.

FIG. 16 is a drawing illustrating a square-cylindrical analytical model 12.

The analytical model 12 has radius of curvature of ridge part 13 R=10 mm, angle formed by curved part of ridge part 13 α=90°, cross-sectional height H=80 mm, flange width fl=20 mm, rising of flange Rf=5 mm, full length=500 mm, with flanges 14 provided at both longitudinal ends, similarly to the analytical model 10 illustrated in FIG. 13. The flange 14 was formed to have a notch 7 in the curved part thereof for representing a notched model (same as FIG. 8C), and also formed continuously around the whole perimeter without forming notch for representing the present invention (same as FIG. 8B).

The analytical model 12 was joined through the flange 14 to the solid walls 15 by spot welding. The diameter of spot was 6 mm. The analytical model 12 was given mechanical characteristic values equivalent to those of 590 MPa-class general cold-rolled steel sheet having a thickness of 1.4 mm. Torsional load was applied, while fixing one solid wall 15, by giving rotational displacement to the other solid wall (net illustrated) around, the axis of the analytical model 12.

Figure 17A:
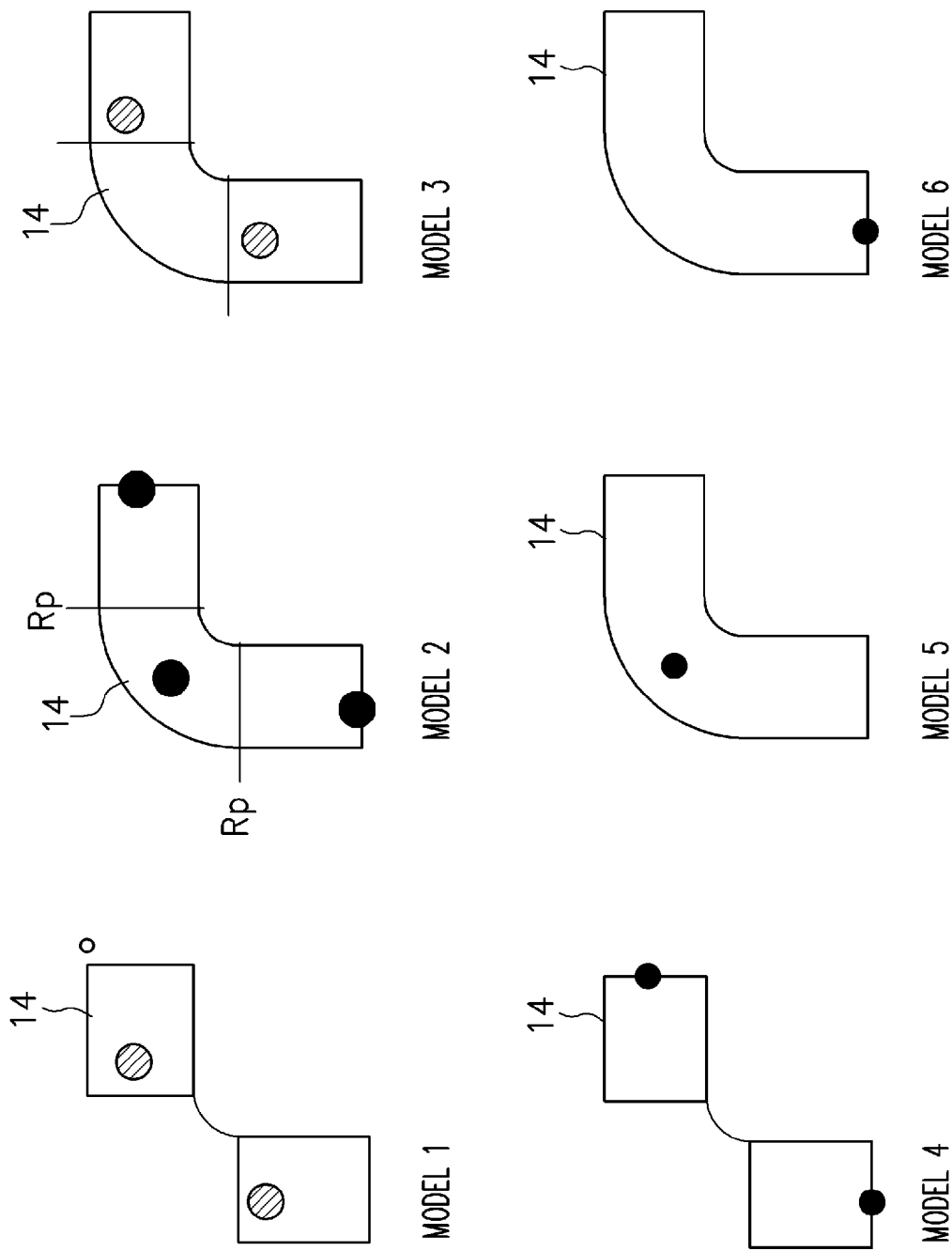
FIG. 17A is a drawing illustrating layouts of the spot-welded points in model 1 to model 6.

FIG. 17A is a drawing illustrating layouts of the spot-welded points on the flange 14 of the analytical model 12.

Model 1 has a notch in each curved part of the flange 14, and has the spot-welded points in the straight parts of the flange 14.

Model 2 has no notch in the curved part of the flange 14, and has the spot-welded points at the center of the straight parts and the curved, parts of the flange 14.

Model 3 has no notch in the curved part of the flange 14, and has the spot-welded points in the straight parts of the flange 14.

Model 4 has a notch in each curved part of the flange 14, and has the spot-welded points at the center of the straight parts of the flange 14.

Model 5 has no notch in the curved part of the flange 14, and has the spot-welded point at the center of each curved part of the flange 14.

Model 6 has no notch in the curved part of the flange 14, and has the spot-welded point at the center of the straight parts of the flange 14, Using models 1 to 6 illustrated in FIG. 17A, influences of the notch exerted on the torsional rigidity, and advantage of provision of the spot-welded points in the curved parts of the flange 14 were investigated.

In each of models 1 to 3, as illustrated in FIG. 17B, the spot-welded points, eight in total, were equally distributed around the center axis of torsion.

On the other hand, in each of models 4 to 6, four spot-welded points in total were used.

FIG. 18 is a drawing illustrating layouts of the spot-welded points in model 2 and its modified models 7, 8, 9, 10 and 16.

In this study, regarding the layouts of the spot-welded points in the flange 14, positions within such areas but possibly yielding better effects were investigated. As illustrated in FIG. 18, the spot-welded point was provided at the fixed center of each straight part of the flange 14, and also provided in the curved part while varying the central angle α" from 0° to 45° at 11.3° intervals.

The spot-welded point in the curved part of the flange 14 falls on a position with a center angle α" of 45° in model 2, falls on a position with a center angle α" of 33.6° in model 8, falls on a position with a center angle α" of 22.5° in model 8, falls on a position with a center angle α" of 11.3° in model 9, and falls on a position with a center angle α" of 0° in model 10. In model 16, it falls on a position in the straight part of the flange (a point 25 mm away from the center of the curved part).

FIG. 19 is a drawing illustrating layouts of the spot-welded points in model 2 and its modified models 11 and 12.

In this study, relation between the torsional rigidity and position of spot welding was investigated while shifting the spot-welded point in the radial direction of the curved part of the flange 14.

The position of spot welding in the curved part of the flange 14 falls on the widthwise center position of the flange 14 in model 2, falls on a position closest to the edge of the flange 14 in model 11, and falls on a position closest to the curve indicating position of rising of the flange 14 in model 12.

The torsional rigidity was evaluated in terms of torsional rigidity per unit angle of torsion (N·m/deg.), before the individual, models cause plastic deformation.

<Results>

Figure 20:
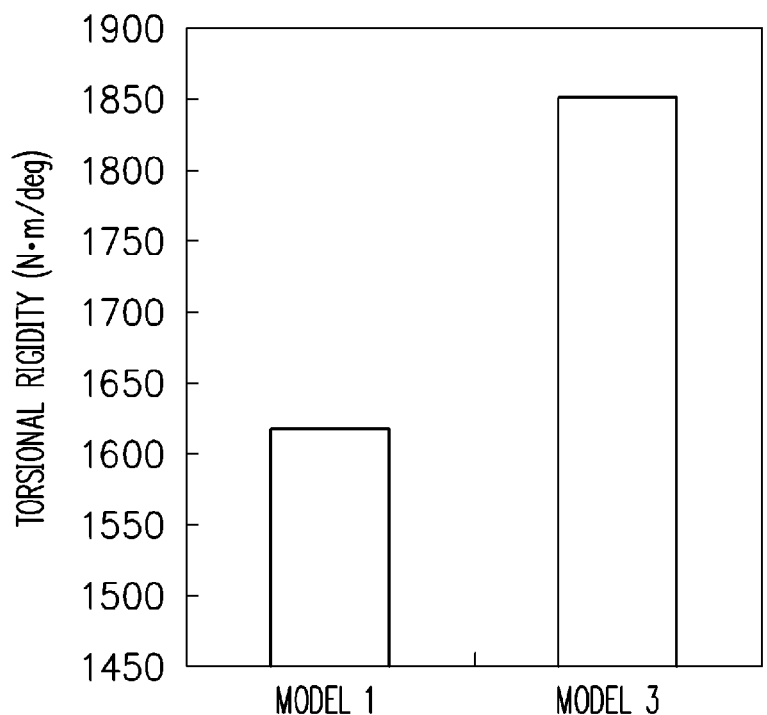
FIG. 20 is a graph illustrating the torsional rigidity of models 1 and 3.
Figure 21:
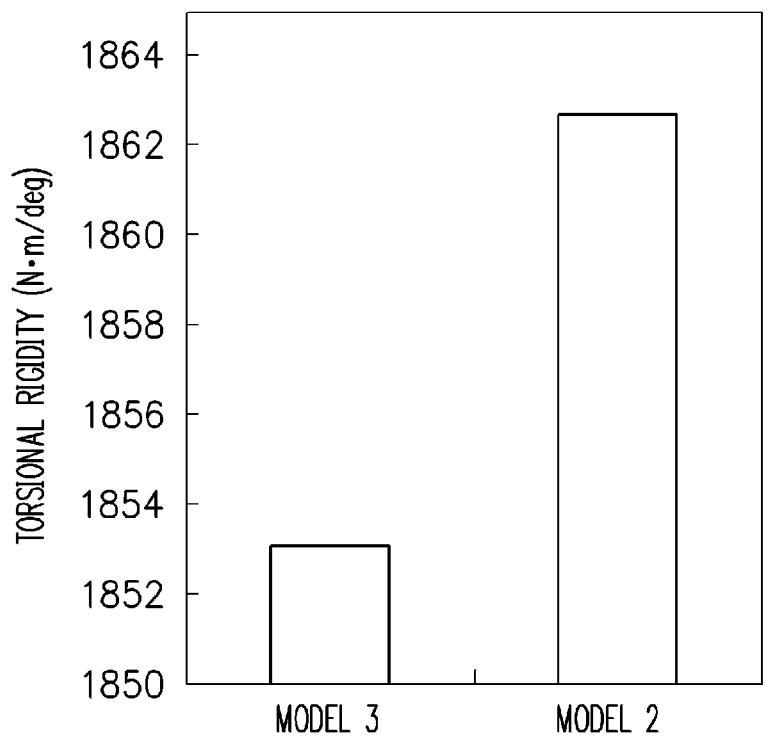
FIG. 21 is a graph illustrating torsional rigidity of models 3 and 2.

FIG. 20 is a graph illustrating torsional rigidity of models 1 to 3. FIG. 21 is a graph illustrating torsional rigidity of models 3 and 2. FIG. 22 is a graph illustrating torsional, rigidity of models 4 and 6. FIG. 23 is a graph illustrating torsional rigidity of models 6 and 5.

It was understood from comparison between FIGS. 20 and 22, that a high level of torsional rigidity say be obtained by forming the curved part of the flange without notching.

It was understood from, comparison between FIGS. 21 and 23, under the same number of spot-welded points, a high level of torsional rigidity may be obtained by disposing the spot-welded points in the curved part of the flange. If the spot-welded points are disposed outside the curved part of the flange, the torsional rigidity and the collision characteristic will degrade, failing in obtaining desired performances.

Figure 24:
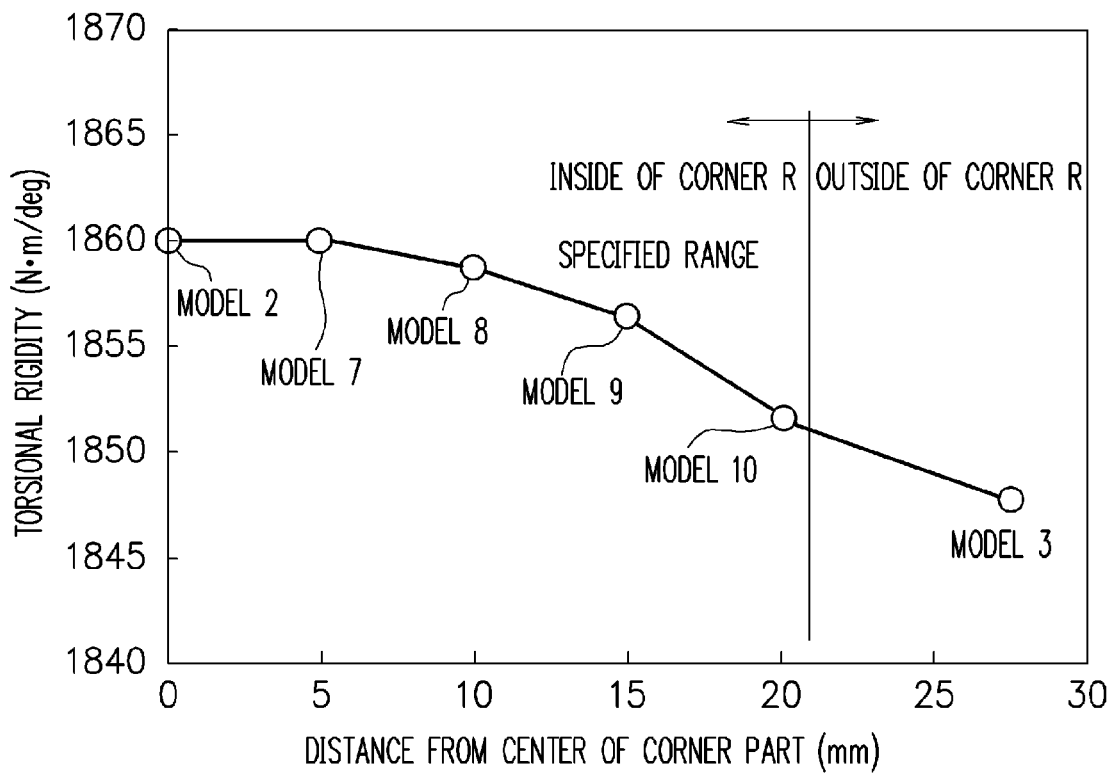
FIG. 24 is a graph collectively illustrating the torsional rigidity of models 2, 3, 7, 8, 9 and 10.
Figure 25:
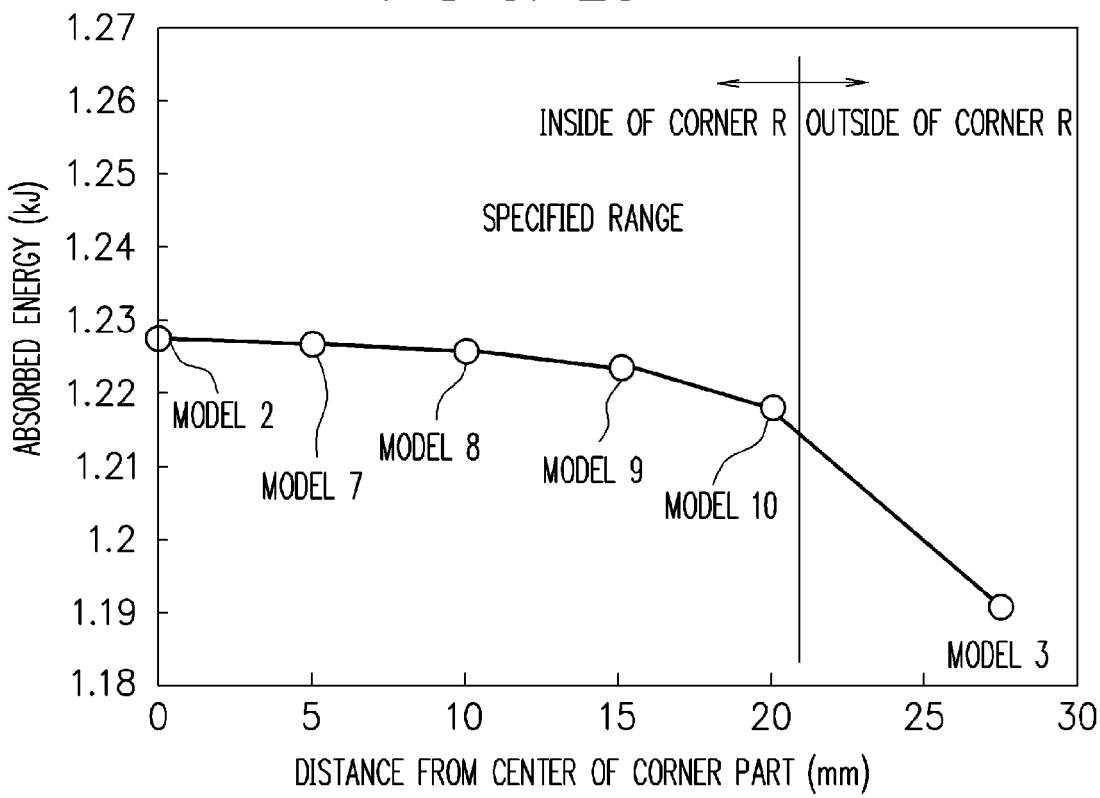
FIG. 25 is a graph collectively illustrating absorbed energy of models 2, 3, 7, 8, 9 and 10.
Figure 26:
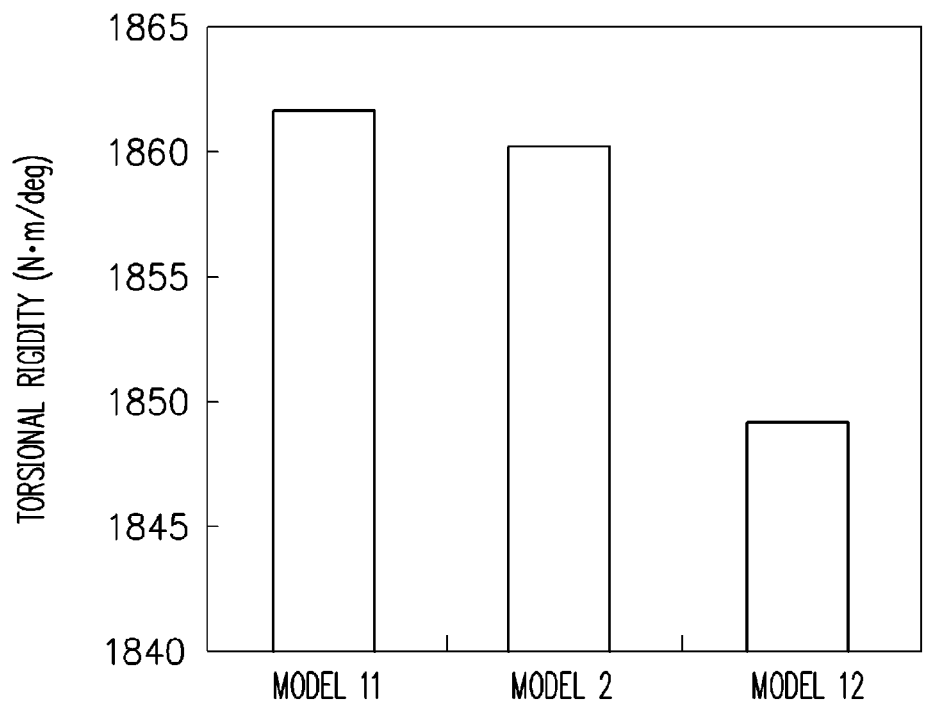
FIG. 26 is a graph illustrating torsional rigidity of models 11, 2 and 12.
Figure 27:
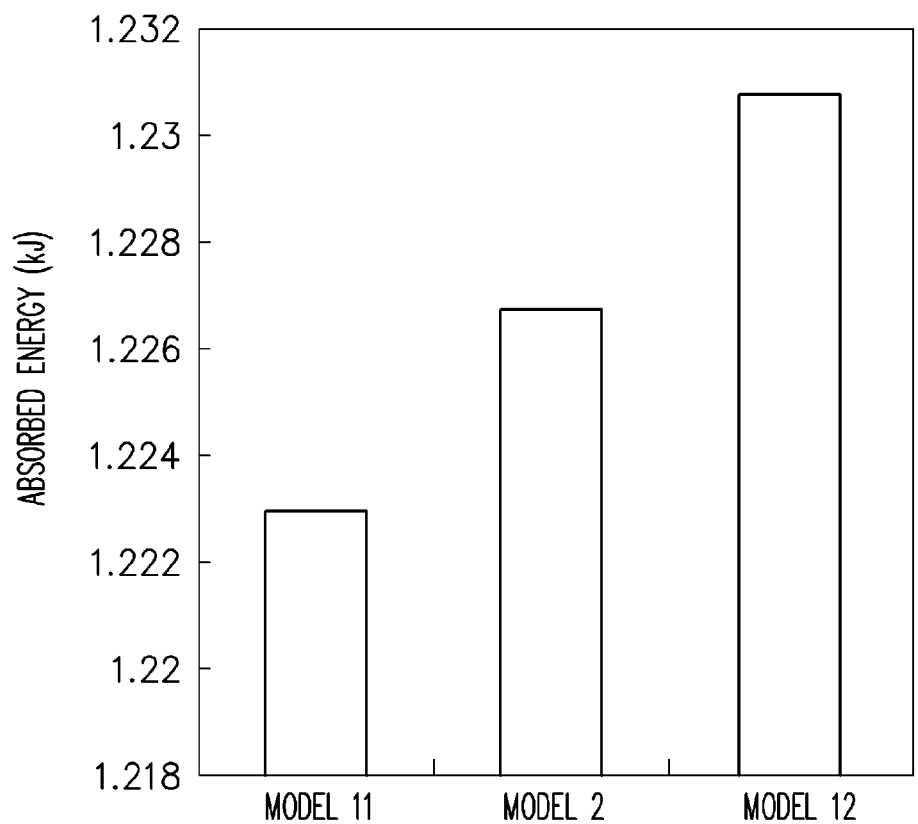
FIG. 27 is a graph illustrating absorbed energy of models 11, 2 and 12.

FIG. 24 is a graph collectively illustrating torsional rigidity of models 2, 3, 7, 8, 9, 10 and 3. FIG. 25 is a graph collectively illustrating absorbed energy of models 2, 3, 7, 8, 9, 10 and 3. FIG. 26 is a graph illustrating torsional rigidity of models 2, 11 and 12. FIG. 27 is a graph illustrating absorbed energy of models 2, 11 and 12.

It is understood from graphs of FIGS. 24 and 25 that, for the case where the spot-welded point is disposed in the curved part of the flange, higher levels of torsional rigidity and absorbed energy may be obtained by disposing the spot-welded point at around the center of the flange (a region ranging from 1/10 to 9/10 of the center angle (deg.) of the curved part).

It is understood from the graph of FIG. 26 that, for the case where the spot-welded point is disposed in the curved part of the flange, higher levels of torsional rigidity and absorbed energy may be obtained by disposing the spot-welded point closer to the edge of the flange (a region ranging from ½ to 1 of the flange width (mm)).

It is understood from the graph of FIG. 27 that, for the case where the spot-welded point is disposed in the curved part of the flange, higher levels of torsional rigidity and absorbed energy may be obtained by disposing the spot-welded point closer to the rounded rising point of the flange (a region ranging from 0 to ½ of the flange width (mm)).

In short, it is understood from the graphs of FIGS. 26 and 27 that, for the purpose of balancing high torsional rigidity and large absorbed energy, it is effective to dispose the spot-welded point in a region ranging from ¼ to ¾ of the flange width.

Figure 28:
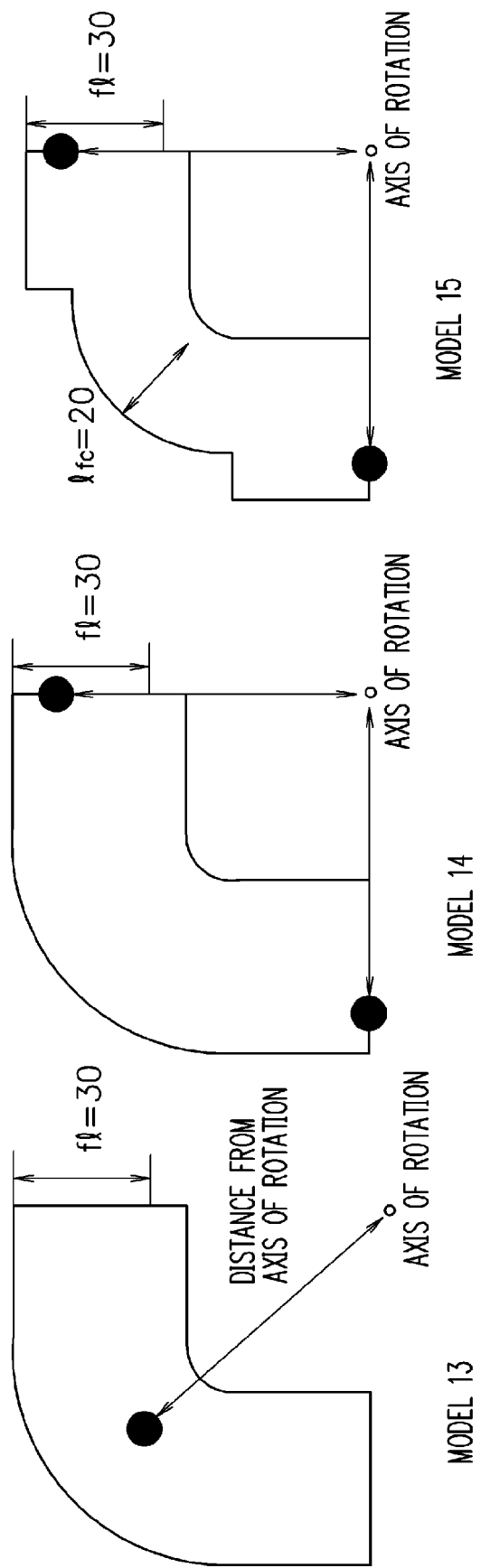
FIG. 28 is a drawing illustrating layouts of the spot-welded points in models 13 to 15.

FIG. 28 is a drawing illustrating layouts of the spot-welded points in models 13 to 15.

As seen in FIG. 28, in all of models 13 to 15, each spot-welded point was disposed the same distance away from the axis of rotation.

FIG. 29 is a graph illustrating the torsional rigidity of models 13 to 15.

As seen in FIG. 29, model 13 having the spot-welded point disposed in the carved part of the flange snowed the highest torsional rigidity, showing a significant difference.

Example 2

Using a floor cross member having two spot-welded, points formed in each curved part of the flange, influences of the positions of spot welding in the flange exerted on the torsional rigidity and absorbed energy were analyzed.

FIG. 30 is a drawing illustrating layouts of the spot-welded points in models 16 and 17.

Figure 31:
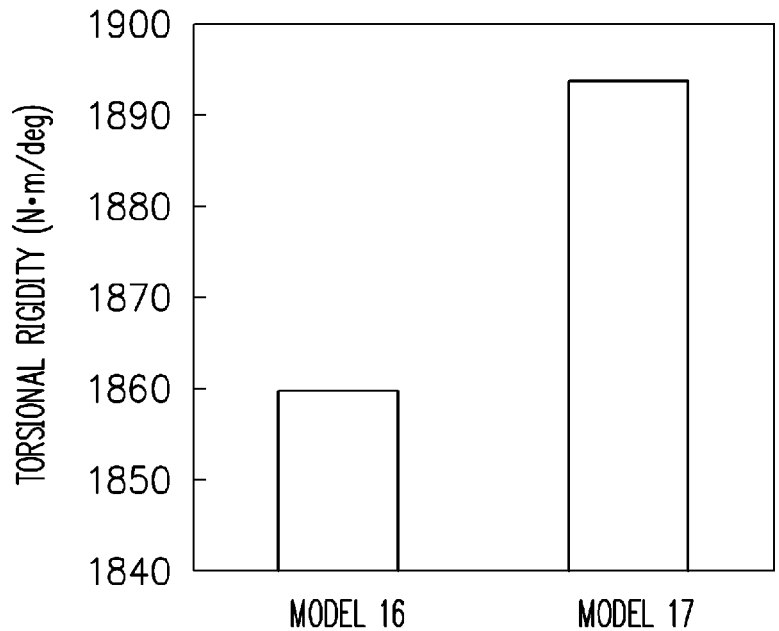
FIG. 31 is a graph illustrating torsional rigidity of models 16 and 17.
Figure 32:
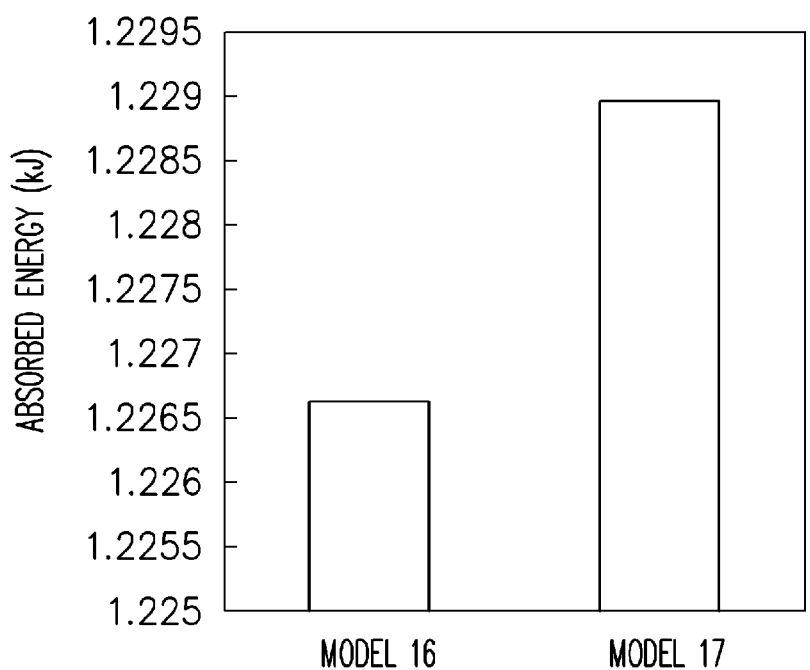
FIG. 32 is a graph illustrating absorbed energy of models 16 and 17.

FIG. 31 is a graph illustrating the torsional rigidity of models 16 and 17, and FIG. 32 is a graph illustrating the absorbed, energy of models 16 and 17.

It is understood from FIG. 31 and FIG. 32 that the torsional rigidity and the collision characteristic are improved by providing the flange around the whole perimeter of the longitudinal end, and by providing a single spot-welded part in each curved part of the flange, and that the torsional rigidity and the collision characteristic are further improved by forming two spot-welded parts in the curved portion of the flange.

INDUSTRIAL APPLICABILITY

The present invention is applicable to a vehicle body composed of longitudinal members such as side sill, roof rail, front floor having floor tunnel part, and side members, which are disposed as aligned in the front-back direction of the vehicle body; and widthwise members such as floor cross member and roof cross member, which are disposed as aligned in the widthwise direction of the vehicle body.

The invention claimed is:

1. A vehicle body comprising a longitudinal member disposed as aligned in the front-back direction of the vehicle body, and a widthwise member disposed as aligned in the widthwise direction of the vehicle body,
   the widthwise member having at least a web surface which configures the top surface, a ridge part contiguous to the web surface, and a vertical wall surface contiguous to the ridge part,
   the widthwise member having a flange formed at a longitudinal end continuously around at least the web surface, the ridge part and the vertical wall surface, and being connected through the flange to the longitudinal member,
   the flange having a flange width $l_{fc}$, at a center in a perimeter direction of a curved part thereof, being not smaller than a minimum flange width $l_{fs}$ in a region excluding the center in the perimeter direction of the curved part, and
   the widthwise member having a tensile strength of 440 MPa or larger.

2. The vehicle body according to claim 1, wherein the widthwise member is a press-molded body having a ditch-like transverse cross-sectional shape.

3. The vehicle body according to claim 1, wherein the ridge part has a radius of curvature R of 8 mm or larger, and the radius of curvature R (mm) and the height H (mm) of the transverse cross-sectional shape of the widthwise member satisfy the relational expression (1) below:

$$0.06 \leq R/H \leq 0.25 \quad (1)$$

4. The vehicle body according to claim 1, wherein the flange width $l_{fc}$ at the center in the perimeter direction of the curved part, and the minimum flange width $l_{fs}$ in the region excluding the center in the perimeter direction of the curved part, satisfy the relational expression ((2) below:

$$l_{fc}/l_{fs} \geq 1.05 \quad (2)$$

5. The vehicle body according to claim 1, wherein the angle formed between an extended line of the web surface and the vertical wall surface is 80° or larger and 100° or smaller.

6. The vehicle body according to claim 1, wherein the curved part has a joint part to be joined with the longitudinal member.

7. The vehicle body according to claim 6, wherein the joint part falls in a range projected on the flange, the range being defined as an inside area bounded, when viewed in a transverse cross-section of the widthwise member at around the flange, by a first line and a second line, the first line being inclined toward the ridge part by a first angle away from a normal line on the web surface at around a boundary between the web surface and the ridge part, and the second line being inclined toward the ridge part by a second angle away from a normal line on the vertical wall surface at around a boundary between the vertical wall surface and the ridge part; and
   wherein each of the first angle and the second angle is 8% of an angle θ between an extended line of the web surface and the vertical wall surface.

8. The vehicle body according to claim 6, wherein the joint part is a spot-welded part.

9. The vehicle body according to claim 1, wherein the flange has a minimum thickness in a portion of the curved part excluding a portion corresponding to the center in the perimeter direction of the ridge part.

10. A vehicle body comprising:
   a front floor panel which has a tunnel part with a vertical wall, nearly at a center of a widthwise direction, and has flange parts at both widthwise edges;
   a side sill joined through the flange part to the front floor panel; and
   a floor cross member which has at least a web surface which configures a top surface, a ridge part contiguous to the web surface, and a vertical wall surface contiguous to the ridge part, and is joined to a top surface of the front floor panel,
   the floor cross member having flanges formed at both longitudinal ends continuously around at least the web surface, the ridge part and the vertical wall surface, and being connected through the flanges to the vertical wall and to the side sill,
   the flanges having a flange $l_{fc}$, at a center in a perimeter direction of a curved part thereof, being not smaller than a minimum flange width $l_{fs}$ in a region excluding the center in the perimeter direction of the curved part, and
   the floor cross member having a tensile strength of 440 MPa or larger.

11. The vehicle body according to claim 10, wherein the floor cross member is a press-molded body having a ditch-like transverse cross-sectional shape.

12. The vehicle body according to claim 10, wherein the ridge part has a radius of curvature R of 8 mm or larger, and the radius of curvature R (mm) and the height H (mm) of the transverse cross-sectional shape of the floor cross member satisfy the relational expression (1) below:

$$0.06 \leq R/H \leq 0.25 \quad (1)$$

13. The vehicle body according to claim 10, wherein the flange width $l_{fc}$ at the center in the perimeter direction of the curved part, and the minimum flange width $l_{fs}$ in the region excluding the center in the perimeter direction of the curved part, satisfy the relational expression (2) below:

$$l_{fc}/l_{fs} \geq 1.05 \quad (2)$$

14. The vehicle body according to claim 10, wherein the angle formed between an extended line of the web surface and the vertical wall surface is 80° or larger and 100° or smaller.

15. The vehicle body according to claim 10, wherein the curved part has a joint part to be joined with the vertical wall or the side sill.

16. The vehicle body according to claim 15, wherein the joint part falls in a range projected on the flange, the range being defined as an inside area bounded, when viewed in a transverse cross-section of the floor cross member at around the flange, by a first line and a second line, the first line being inclined toward the ridge part by a first angle away from a normal line on web surface at around a boundary between the web surface and the ridge part, and the second line being inclined toward the ridge part by a second angle away from a normal line on the vertical wall surface at around a boundary between the vertical wall surface and the ridge part; and wherein each of the first angle and the second angle is 8% of an angle θ between an extended line of the web surface and the vertical wall surface.

17. The vehicle body according to claim 15, wherein the joint part is a spot-welded part.

18. The vehicle body according to claim 10, wherein the flange has a minimum thickness in a portion of the curved part excluding a portion corresponding to the center in the perimeter direction of the ridge part.

19. The vehicle body according to claim 1, wherein the widthwise member is joined, alone by itself, to the longitudinal member, at the end having the flange formed thereon.

* * * * *

UNITED STATES PATENT AND TRADEMARK OFFICE
CERTIFICATE OF CORRECTION

PATENT NO. : 9,199,670 B2
APPLICATION NO. : 14/390066
DATED : December 1, 2015
INVENTOR(S) : Otsuka et al.

It is certified that error appears in the above-identified patent and that said Letters Patent is hereby corrected as shown below:

Specification

Column 2, line 44, change "the front, floor" to -- "the front floor" --; and

Column 2, line 46, change "tunnel, part" to -- "tunnel part" --; and

Column 2, line 52, change "weight, reduction" to -- "weight reduction" --; and

Column 4, line 22, change "invention, is" to -- "invention is" --; and

Column 5, line 52, change "$l_{fc}/l_{fs} \geq 1.05$" to -- "$l_{fc}/l_{fs} \geq 1.05$" --; and Column 6, line 36, change "is a or cross-sectional" to -- "is a cross-sectional" --; and Column 7, line 29, change "7,3,9" to -- "7,8,9" --; and Column 7, line 50, change "models 3 to 15" to -- "models 13 to 15" --; and Column 8, line 27, change "sill, outer" to -- "sill outer" --; and Column 9, line 1, change "Illustrated" to -- "illustrated" --; and Column 9, line 45, change "the stretch, flanging" to -- "the stretch flanging" --; and Column 9, line 48, change "prevented, from" to -- "prevented from" --; and Column 9, line 58, change "height R of" to -- "height H of" --; and Column 9, line 60, change "as compared, with" to -- "as compared with" --; and Column 10, line 9, change "part 20 fails in" to -- "part 20 falls in" --; and Column 11, line 33, change "4aand" to -- "4a and" --; and Column 11, line 38, change "flange 4e-2, at" to -- "flange 4e, at" --; and Column 11, line 43, change "4cand" to -- "4c and" --; and Column 12, line 66, change "structure or vehicle" to -- "structure of vehicle" --; and Column 12, line 67, change "analyzed, by" to -- "analyzed by" --; and Column 13, line 25, change "relation, between" to -- "relation between" --; and Column 13, line 48, change "model 3 has" to -- "model 9 has" --; and Signed and Sealed this
Fifth Day of July, 2016

Michelle K. Lee
*Director of the United States Patent and Trademark Office*

CERTIFICATE OF CORRECTION (continued)
U.S. Pat. No. 9,199,670 B2

Specification

Column 15, line 30, change "cold-roiled steel" to -- "cold-rolled steel" --; and Column 15, line 32, change "(net illustrated)" to -- "(not illustrated)" --; and Column 15, line 41, change "curved, parts" to -- "curved parts" --; and Column 15, line 53, change "flange14," to -- "flange14." --; and Column 16, line 7, change "model 8," to -- "model 7," --; and Column 16, line 36, change "rigidity say be" to -- "rigidity may be" --; and Column 17, line 16, change "the carved part of the flange snowed the" to -- "the curved part of the flange showed the" --; and Column 17, line 21, change "spot-welded, points" to -- "spot-welded points" --; and

Claims

Claim 4, Column 18, line 16, change "expression ((2)" to -- "expression (2)" --; and Claim 10, Column 18, line 62, change "flange $l_{fc}$," to -- "flange width $l_{fc}$," --.